(12) United States Patent
Hayashi et al.

(10) Patent No.: US 9,943,986 B2
(45) Date of Patent: Apr. 17, 2018

(54) SEPARATING DEVICE AND SEPARATING METHOD OF MATERIAL OF ABSORBENT ARTICLE

(71) Applicant: UNICHARM CORPORATION, Ehime (JP)

(72) Inventors: Tomoki Hayashi, Kagawa (JP); Hidetaka Oyama, Kagawa (JP); Masashi Kagawa, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 14/440,079

(22) PCT Filed: Oct. 24, 2013

(86) PCT No.: PCT/JP2013/078798
§ 371 (c)(1),
(2) Date: May 1, 2015

(87) PCT Pub. No.: WO2014/069322
PCT Pub. Date: May 8, 2014

(65) Prior Publication Data
US 2015/0298362 A1    Oct. 22, 2015

(30) Foreign Application Priority Data

Nov. 2, 2012   (JP) .................... 2012-243054

(51) Int. Cl.
*B03D 3/06*       (2006.01)
*B29B 17/02*      (2006.01)
(Continued)

(52) U.S. Cl.
CPC ............... *B29B 17/02* (2013.01); *B07B 1/10* (2013.01); *B07B 1/20* (2013.01); *B07B 4/02* (2013.01);
(Continued)

(58) Field of Classification Search
CPC .... B07B 1/00; B07B 1/10; B07B 1/20; B07B 9/00; B07B 11/02; B07B 13/003;
(Continued)

(56) References Cited

U.S. PATENT DOCUMENTS 3,890,220 A    6/1975   Anderson
3,909,397 A    9/1975   Aldinger
(Continued)

FOREIGN PATENT DOCUMENTS

CN    1137245 A    12/1996
CN    1149262 A    5/1997
(Continued)

OTHER PUBLICATIONS

International Search Report and Written Opinion dated Jan. 28, 2014 in International Application No. PCT/JP2013/078798.
(Continued)

*Primary Examiner* — Joseph C Rodriguez
*Assistant Examiner* — Kalyanavenkateshware Kumar
(74) *Attorney, Agent, or Firm* — Hauptman Ham, LLP

(57) ABSTRACT

A separating device that separates particulate superabsorbent polymers and liquid absorbent fibers included in a material of an absorbent article. The device includes: a belt member that moves along a predetermined moving direction while receiving the falling material on an upper surface; and an airflow supply mechanism that supplies an airflow in a direction opposite to the moving direction of the belt member, along the upper surface from a downstream side of the moving direction relative to a position where the material falls. In a case the superabsorbent polymers are sent to the downstream side of the moving direction by movement of the belt member, the airflow rolls the liquid absorbent fibers on the upper surface of the belt member and forms fiber balls while regulating movement of the liquid absorbent fibers to (Continued)

the downstream side of the moving direction, to separate the liquid absorbent fibers and the superabsorbent polymers.

15 Claims, 14 Drawing Sheets

(51) Int. Cl.
    *B07B 1/20*     (2006.01)
    *B07B 4/02*     (2006.01)
    *B07B 9/00*     (2006.01)
    *B07B 15/00*     (2006.01)
    *B07B 1/10*     (2006.01)
    *B07B 13/00*     (2006.01)
    *B07B 1/00*     (2006.01)
    *B07B 4/08*     (2006.01)
    *B29L 31/48*     (2006.01)
    *B29K 105/26*     (2006.01)

(52) U.S. Cl.
    CPC .............. *B07B 9/00* (2013.01); *B07B 13/003* (2013.01); *B07B 15/00* (2013.01); *B07B 1/00* (2013.01); *B07B 4/08* (2013.01); *B29B 2017/0203* (2013.01); *B29K 2105/26* (2013.01); *B29L 2031/4878* (2013.01); *Y02W 30/622* (2015.05)

(58) Field of Classification Search
    CPC .. B07B 15/00; B07B 4/02; B07B 4/08; B29B 17/02; B02C 23/30
    USPC .............................. 209/5, 606, 629, 635, 691
    See application file for complete search history.

(56) References Cited

U.S. PATENT DOCUMENTS

| | | | | | |
|---|---|---|---|---|---|
| 4,278,537 | A | * | 7/1981 | Schmidt | B03B 4/00 209/469 |
| 4,305,507 | A | * | 12/1981 | Wittkopf | B01D 46/20 162/4 |
| 4,350,591 | A | * | 9/1982 | Lee | B01D 33/03 210/384 |
| 8,016,119 | B2 | * | 9/2011 | Legtenberg | B07B 13/003 209/615 |
| 8,286,798 | B2 | * | 10/2012 | Ricketts | A01D 45/028 209/138 |
| 2010/0291980 | A1 | * | 11/2010 | Ricketts | A01D 45/02 460/26 |
| 2011/0297591 | A1 | * | 12/2011 | Schmidt | B07B 4/02 209/635 |

FOREIGN PATENT DOCUMENTS

| | | |
|---|---|---|
| JP | 11-235575 A | 8/1999 |
| JP | 2937996 B1 | 8/1999 |
| JP | 2001-336077 A | 12/2001 |
| JP | 2003-200147 A | 7/2003 |
| JP | 2004-313878 A | 11/2004 |
| JP | 2009-262088 A | 11/2009 |
| WO | 2012/083994 A1 | 6/2012 |

OTHER PUBLICATIONS

International preliminary report on patentability and Written Opinion dated May 14, 2015, corresponding to PCT/JP2013/078798.
Extended European Search Report in EP Application No. 13851534.1, dated Jun. 27, 2016.
Office Action in CN Application No. 201380063362.9, dated Apr. 25, 2016.

* cited by examiner

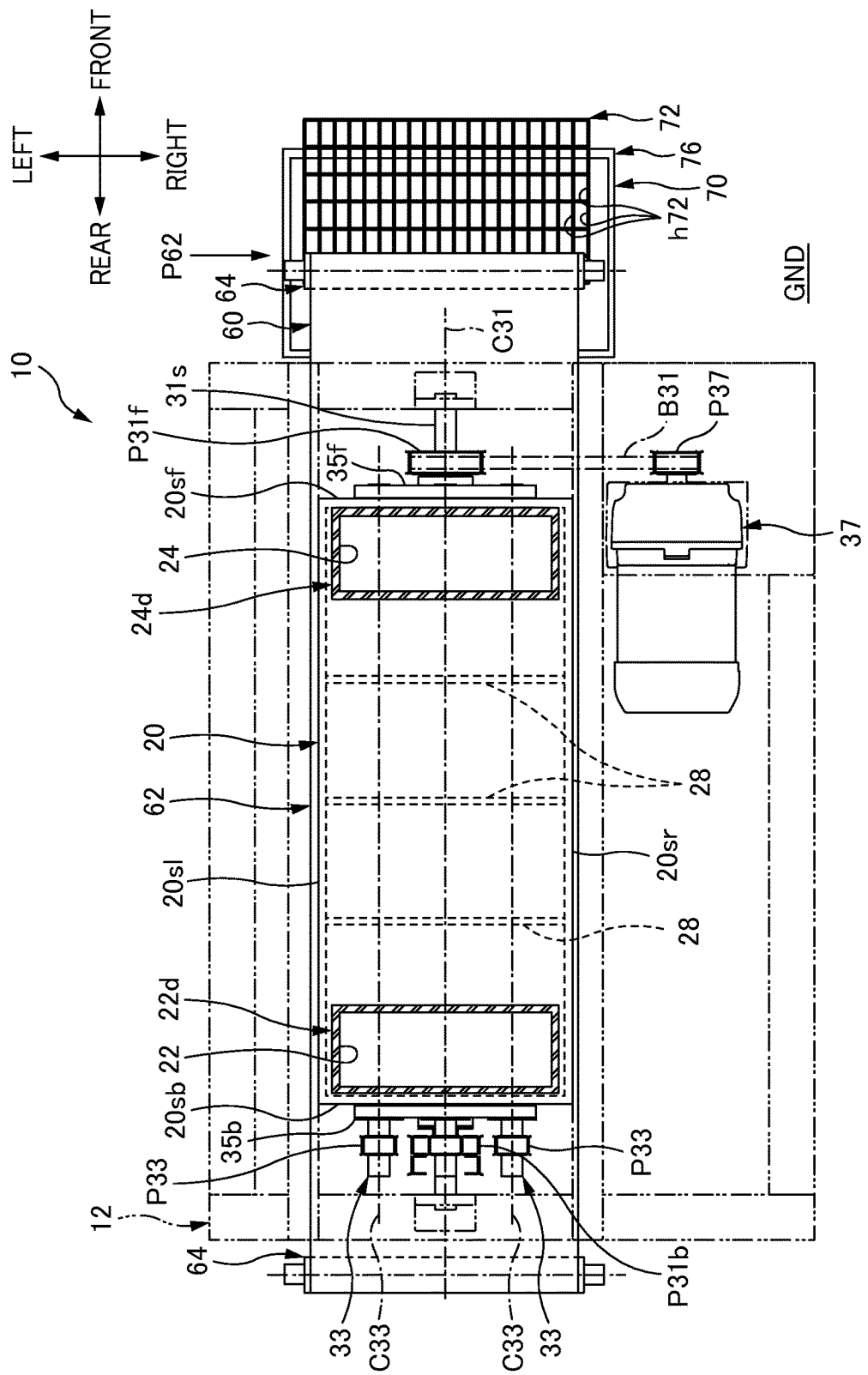
VIEW C-C    FIG. 1C

VIEW B-B

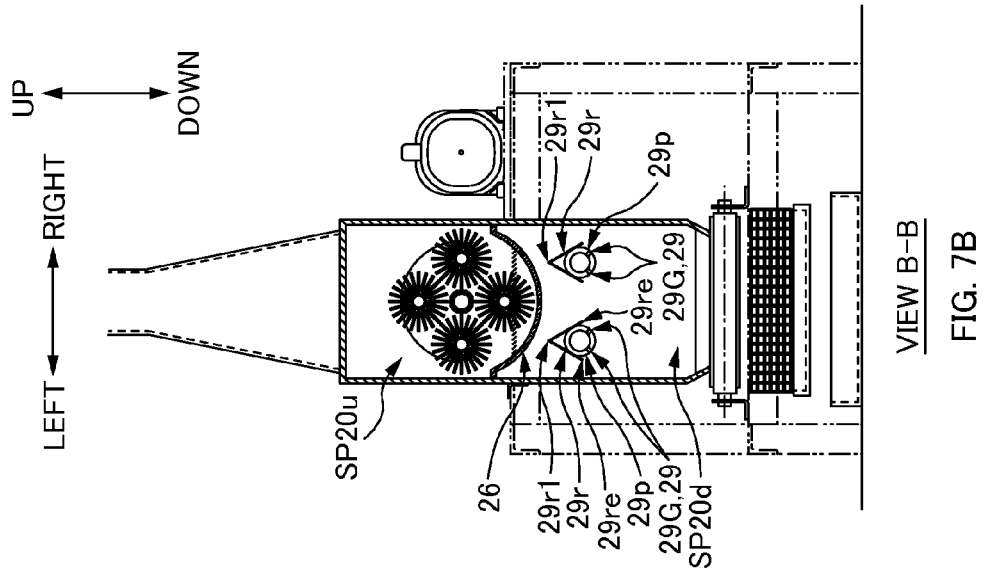
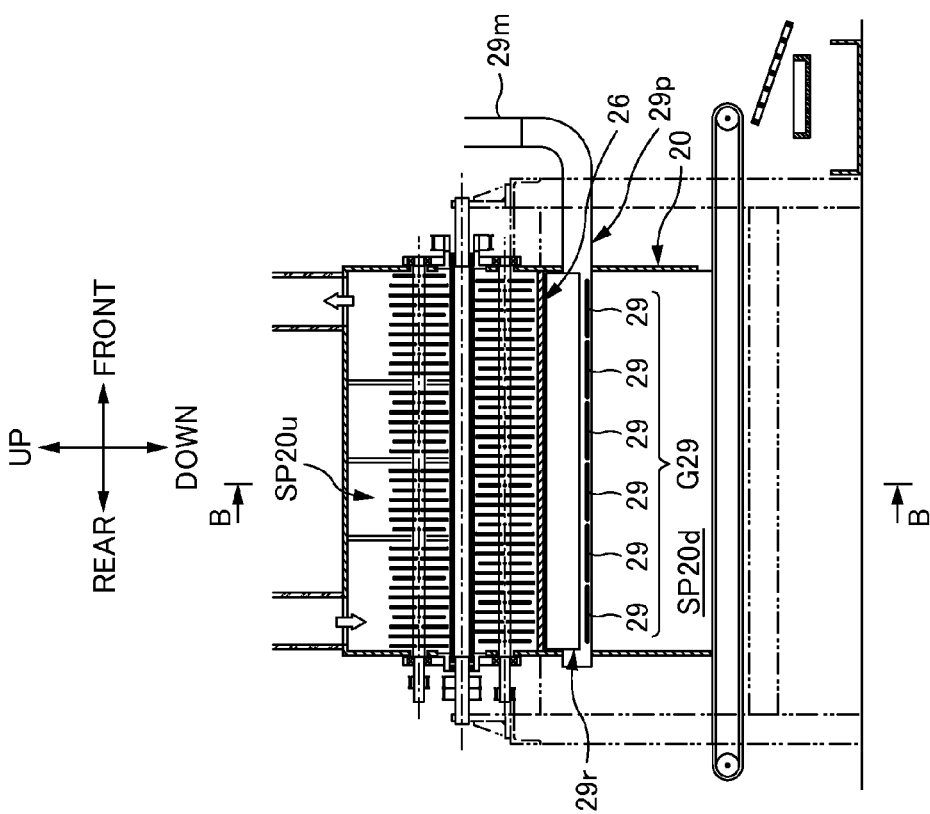

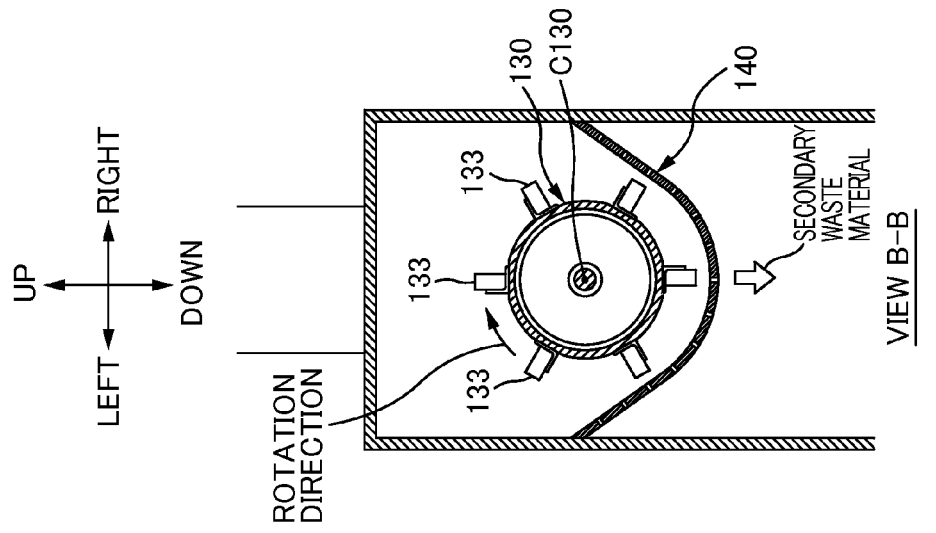
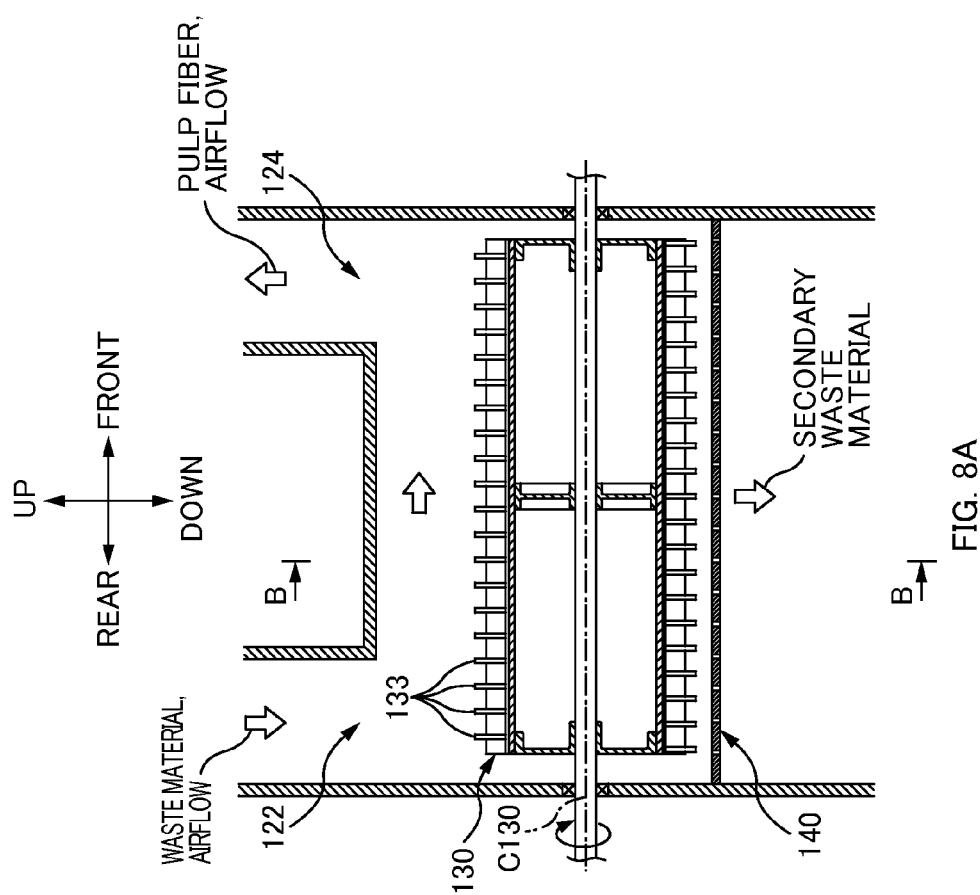

SEPARATING DEVICE AND SEPARATING METHOD OF MATERIAL OF ABSORBENT ARTICLE

RELATED APPLICATIONS

The present application is a National Phase of International Application Number PCT/JP2013/078798, filed Oct. 24, 2013, and claims priority of Japanese Patent Application No. 2012-243054 filed on Nov. 2, 2012.

TECHNICAL FIELD

The present invention relates to separating devices that separate particulate superabsorbent polymers and liquid absorbent fibers such as pulp fibers included in a material of an absorbent article such as a disposable diaper, and separating methods thereof.

BACKGROUND ART

Conventionally, as a material of an absorbent article such as a disposable diaper and a sanitary napkin, liquid absorbent fibers such as pulp fibers and particulate superabsorbent polymers (hereinbelow, referred to as SAP) and the like have been used.

Recently, from the viewpoint of recycling of resources, waste material such as defective articles of absorbent articles and defective articles of absorbent bodies are not disposed of as is, but the pulp fibers, the SAP and the like that can be recycled are collected from the waste material.

Regarding this point, PTL 1 discloses a device that separates and collects the pulp fibers and the SAP from the waste material in which the pulp fibers, the SAP and the like are mixed.

In more detail, this device includes a case, and inside the case are housed three rotation members for opening fiber. Further, a ceiling section of the case is provided with a charge port and a discharge port, and a lattice member is provided as a bottom section. The waste material is charged from the charge port into the case while riding on an airflow, and this waste material is opened with the above three rotation members. The pulp fibers of the waste material that have been opened ride on the airflow and are discharged from the discharge port and collected, and on the other hand the SAP and the like with a higher specific gravity than the pulp fibers are passed through openings of the lattice member that is the bottom section and dropped and collected.

CITATION LIST

Patent Literature

PTL1 Japanese Patent Application Laid-open Publication No. 2001-336077

SUMMARY

Technical Problem

However, with this device, there exist pulp fibers passing through the aforementioned lattice member, and thus it is difficult to collect the SAP with high purity.

The present invention has been made in view of the above described conventional problem, and an object is to provide a separating device capable of further improving the purity of the collected superabsorbent polymers, by being connected in series to the downstream side of an appropriate separating device and used, and a separating method thereof, as well as by being able to be used alone as a separating device and separating method thereof.

Solution to Problem

In order to achieve an object described above, an aspect of the invention is a separating device that separates particulate superabsorbent polymers and liquid absorbent fibers included in a material of an absorbent article, the separating device including:

a belt member configured to move along a predetermined moving direction while receiving the falling material on an upper surface of the belt member; and an airflow supply mechanism configured to supply an airflow in a direction opposite to the moving direction of the belt member, along the upper surface from a downstream side of the moving direction with respect to a position where the material falls, wherein in a case the superabsorbent polymers are sent to the downstream side of the moving direction by way of movement of the belt member, the airflow rolls the liquid absorbent fibers on the upper surface of the belt member and forms fiber balls while regulating movement of the liquid absorbent fibers to the downstream side of the moving direction, to separate the liquid absorbent fibers and the superabsorbent polymers.

Further, a method for separating particulate superabsorbent polymers and liquid absorbent fibers included in a material of an absorbent article, the method including:

moving, along a predetermined moving direction, a belt member configured to receive the falling material on an upper surface of the belt member; and supplying an airflow in a direction opposite to the moving direction of the belt member, along the upper surface from a downstream side of the moving direction with respect to a position where the material falls, wherein in a case the superabsorbent polymers are sent in the moving direction by way of movement of the belt member, the airflow rolls the liquid absorbent fibers on the upper surface of the belt member and forms fiber balls while regulating movement of the liquid absorbent fibers in the moving direction, to separate the liquid absorbent fibers and the superabsorbent polymers.

Other features of the present invention will be made clear through the present specification with reference to the accompanying drawings.

Advantageous Effects of Invention

According to this invention, a separating device capable of further improving the purity of the collected superabsorbent polymers by being connected in series to the downstream side of an appropriate separating device and used, and a separating method thereof, can be provided.

BRIEF DESCRIPTION OF DRAWINGS

FIG. 1C is a C-C arrow view in FIG. 1A.

FIG. 7A is a schematic vertical sectional view showing a modified example of a suction port 29, and FIG. 7B is a B-B arrow view in FIG. 7A.

FIG. 8A is a schematic vertical sectional view showing a rotation member 130 according to another embodiment mode, and FIG. 8B is a B-B arrow view in FIG. 8A.

DESCRIPTION OF EMBODIMENTS

Figure 1A:
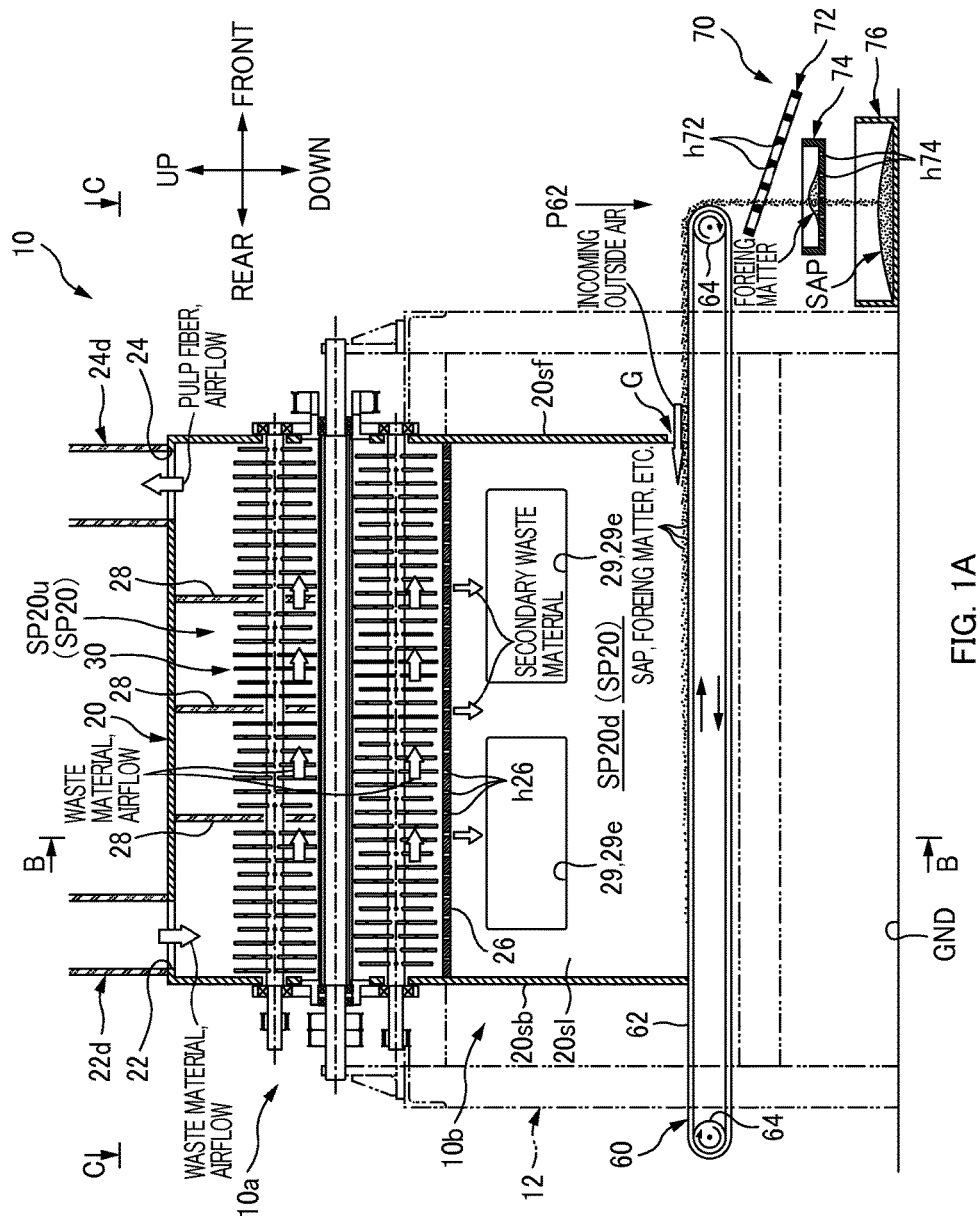
FIG. 1A is a schematic vertical sectional view of a separating device 10 according to a present embodiment mode.

At least the following matters will become clear with reference to this specification and the attached drawings.

A separating device that separates particulate superabsorbent polymers and liquid absorbent fibers included in a material of an absorbent article, the separating device comprising:

a belt member configured to move along a predetermined moving direction while receiving the falling material on an upper surface of the belt member; and an airflow supply mechanism configured to supply an airflow in a direction opposite to the moving direction of the belt member, along the upper surface from a downstream side of the moving direction with respect to a position where the material falls, wherein in a case the superabsorbent polymers are sent to the downstream side of the moving direction by way of movement of the belt member, the airflow rolls the liquid absorbent fibers on the upper surface of the belt member and forms fiber balls while regulating movement of the liquid absorbent fibers to the downstream side of the moving direction, to separate the liquid absorbent fibers and the superabsorbent polymers.

With such a separating device for a material of an absorbent article, it is possible to easily and reliably separate particulate superabsorbent polymers and liquid absorbent fibers included in the material. Thus, it can be used as a separate separating device, or also used by being connected in series to the downstream side of an appropriate separating device, thereby being able to further improve the impurity of the collected superabsorbent polymers.

A separating device for a material of an absorbent article preferably includes:

a case arranged such that an opened lower end of the case facing the upper surface of the belt member; and a negative pressure condition forming mechanism configured to maintain an interior space of the case in a negative pressure condition in which an air pressure is lower than that of an exterior of the case, wherein preferably a gap, formed between the upper surface of the belt member and a wall section positioned on the downstream side of the moving direction of the belt member among the wall sections of the case, functions as the airflow supply mechanism in cooperation with the negative pressure condition forming mechanism, and incoming outside air entering from the gap to the interior space of the case becomes the airflow in a direction opposite to the moving direction.

With such a separating device for a material of an absorbent article, the gap between the upper surface of the belt member and the wall section positioned on the above downstream side among the wall sections of the case; and the negative pressure condition forming mechanism, cooperate with each other and function as the airflow supply mechanism, and thus the airflow supply mechanism is configured with a very simple configuration, resulting in achievement in simplification of a device configuration.

A separating device for a material of an absorbent article, wherein preferably the fiber balls, whose movement in the moving direction is regulated by means of the airflow, rolls and entangles the surrounding liquid absorbent fibers and grows into a snowball form, and the fiber balls having grown to a size corresponding to the gap are caught between the belt member and the case at the gap, a moving force in the moving direction given from the belt member increases and acts on the fiber balls, and the fiber balls, while resisting the airflow, are ejected from the gap to the exterior of the case based on the increased moving force.

With such a separating device for a material of an absorbent article, the fiber balls having grown to the appropriate size are ejected to the exterior of the case by the belt member, and thus accumulation of the fiber balls in the case can be effectively avoided. In this way, work of removing fiber balls which may be accumulated in the case does not have to be conducted, and maintenance work can be reduced.

A separating device for a material of an absorbent article, wherein preferably the belt member is an endless belt, a folded position in the moving direction of the belt member is positioned outwardly with respect to the case, a sieve member is arranged below the folded position, and a hole size of a plurality of through holes in the sieve member is set to such a size as to allow the superabsorbent polymers to pass through the sieve member and restrain the fiber balls from passing through the sieve member.

With such a separating device for a material of an absorbent article, the superabsorbent polymers promptly pass through the sieve member, while the fiber balls are restrained from passing through the sieve member and captured by the sieve member, among the superabsorbent polymers and the fiber balls falling from the belt member at the folded position. Thus, the liquid absorbent fibers which are fiber balls and the superabsorbent polymers can be separated.

A separating device for a material of an absorbent article, wherein preferably the sieve member includes a transporting mechanism configured to transport the fiber balls, having been restrained from passing through the sieve member and captured by the sieve member, to the position distant from a landing position at the sieve member.

With such a separating device for a material of an absorbent article, the fiber balls captured by the sieve member are promptly transported to the position distant from the landing position at the sieve member by the transporting mechanism. Thus, it can be effectively avoided that the superabsorbent polymers falling from the folded position are accumulated on the fiber balls captured by the sieve member and a sieving function is deteriorated.

A separating device for a material of an absorbent article, wherein preferably a second sieve member is arranged below the sieve member, and a hole size of a plurality of through holes of the second sieve member is set such a size as to allow the superabsorbent polymers to pass through the second sieve member and restrain foreign matter included in the material from passing through the second sieve member.

With such a separating device for a material of an absorbent article, in the case of falling to the position of the second sieve member, the superabsorbent polymers promptly pass through the second sieve member, and the foreign matter is restrained from passing the sieve member and is captured. Thus, the superabsorbent polymers and the foreign matter can be separated.

A separating device for a material of an absorbent article, wherein preferably the interior space of the case is partitioned by a partition member into an upper space and a lower space adjacent to a lower side of the upper space, a main body of an opening mechanism, configured to open a primary material and separate the opened primary material into a secondary material and liquid absorbent fibers, is arranged in the upper space, and the opening mechanism is configured to cause the secondary material to fall, as the material, toward the upper surface of the belt member, the opening mechanism includes
a charge port, formed in the case, through which the primary material is charged to the upper space while being made to ride on an airflow,
a rotation member housed in the upper space as the main body of the opening mechanism, the rotation member being configured to stir and open the primary material,
a discharge port through which liquid absorbent fibers in the primary material opened by the rotation member are discharged from an interior of the upper space while being made to ride on an airflow, and
a plurality of through holes formed in the partition member, the secondary material falls through the through holes toward the upper surface of the belt member, and a first blower, configured to charge an airflow from the charge port, and a second blower, configured to discharge an airflow from the discharge port with a discharge amount larger than a charge amount of the air flow of the first blower, cooperate with each other and function as the negative pressure condition forming mechanism.

With such a separating device for a material of an absorbent article, the first blower, configured to form an airflow at the charge port, and the second blower, configured to form an airflow at the discharge port, cooperate with each other, and function as the negative pressure condition forming mechanism configured to bring an interior space of the case into a negative pressure condition. Thus, a dedicated device for forming a negative pressure condition is not provided, resulting in achievement in simplification of a device configuration.

A separating device for a material of an absorbent article, wherein preferably a suction port, through which air in the lower space is suctioned, is provided in the lower space, and liquid absorbent fibers, passing downward through the through holes of the partition member and being suspended in the lower space, are suctioned through the suction port.

With such a separating device for a material of an absorbent article, the liquid absorbent fibers being suspended in the lower space are suctioned through the suction port, and thus a return rate of the liquid absorbent fibers can be improved.

A separating device for a material of an absorbent article, wherein preferably assuming that a direction from the charge port toward the discharge port is a predetermined direction, the rotation member includes a revolving axis whose axial direction is set along the predetermined direction, and a shaft member configured to rotate about a rotating axis whose axial direction is set along the predetermined direction while revolving about the revolving axis, and the shaft member includes protruding sections protruding outwardly in a direction that intersects with the axial direction of the shaft member.

With such a separating device for a material of an absorbent article, the rotation member includes the shaft member including protruding sections, and such a shaft member configured to rotate while revolving, hit the primary material with the protruding sections, and stir and open the primary material. Thus, the performance of opening the primary material is remarkably improved, and as a result, the performance of separating the liquid absorbent fibers from the primary material can be improved.

A separating device for a material of an absorbent article, wherein preferably the charge port and the discharge port are provided in a ceiling section in the case, and a regulating member hangs from the ceiling section at a predetermined position between the charge port and the discharge port in the upper space, the regulating member being configured to regulate movement of the primary material from the charge port to the discharge port.

With such a separating device for a material of an absorbent article, an extension of a holding time of the primary material in the upper space can be achieved, and a long holding time can be secured. Thus, opening of the primary material can be progressed to a sufficient level. In other words, opening performance can be further improved.

Further, a method for separating particulate superabsorbent polymers and liquid absorbent fibers included in a material of an absorbent article, the method comprising:

moving, along a predetermined moving direction, a belt member configured to receive the falling material on an upper surface of the belt member; and supplying an airflow in a direction opposite to the moving direction of the belt member, along the upper surface from a downstream side of the moving direction with respect to a position where the material falls, wherein in a case the superabsorbent polymers are sent in the moving direction by way of movement of the belt member, the airflow rolls the liquid absorbent fibers on the upper surface of the belt member and forms fiber balls while regulating movement of the liquid absorbent fibers in the moving direction, to separate the liquid absorbent fibers and the superabsorbent polymers.

With such a separating device for a material of an absorbent article, it is possible to easily and reliably separate the superabsorbent polymers and the liquid absorbent fibers included in the material. Thus, it can be used as a separate separating method, or also used by being connected in series to the downstream side of an appropriate separating device, thereby being able to further improve the impurity of the collected superabsorbent polymers.

Present Embodiment Mode

Figure 1B:
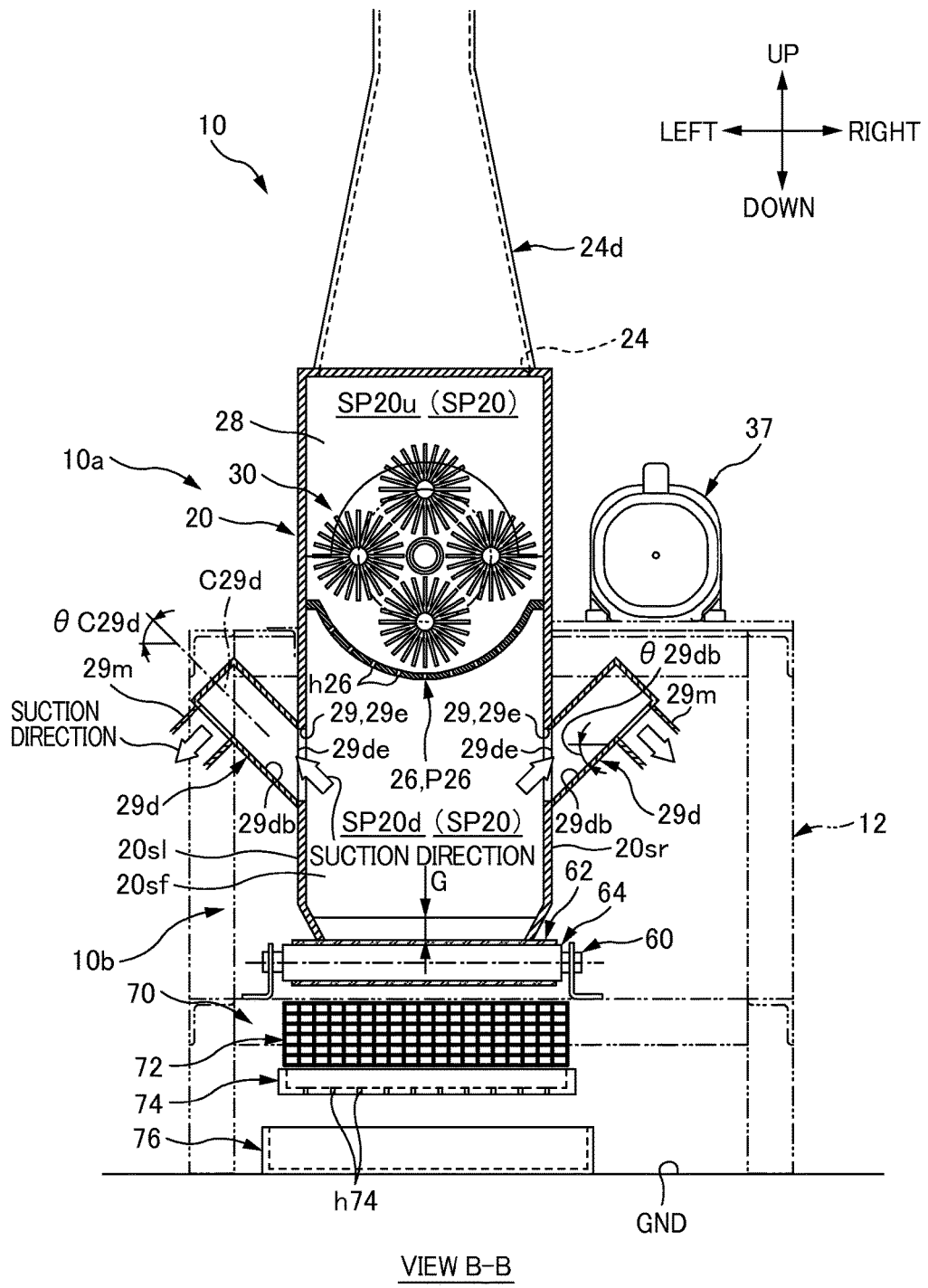
FIG. 1B is a B-B arrow view in FIG. 1A.

FIG. 1A to FIG. 1C are explanatory views of a separating device 10 of a present embodiment mode. FIG. 1A is a schematic vertical sectional view, FIG. 1B is a B-B arrow view in FIG. 1A, and FIG. 1C is a C-C arrow view in FIG. 1A. It should be noted that, in order to prevent mix-up of the drawings, in all the drawing to be used hereafter including FIG. 1A to FIG. 1C, a sectional line that should be applied in reality to the sectional section is partially omitted in some cases.

This separating device 10 is charged with a waste material of an absorbent article as a material to be separated. The waste material has mainly, for example, an absorbent body of a disposable diaper. In other words, pulp fibers and particulate SAP that is mixed in the pulp fibers are the main materials of the waste material.

The absorbent body of the waste material is obtained by, for example, taking off from defective diapers made in a manufacturing process of disposable diapers such as leak prevention sheets made of a resin film, top sheets and back sheets made of nonwoven fabric, and rubber thread. In this case, however, when taking off the above various sheets and the like from the diaper, for example, an applying part of a hot melt adhesive, a rubber thread and the like are mixed in the absorbent body in fragment forms as foreign matter. Thus, the separating device 10 separates the waste material into approximately three things, which are pulp fibers, SAP, and foreign matter. Namely, the pulp fibers are one example of "liquid absorbent fibers" according to the claims.

The separating device 10 includes: a primary separating unit 10a configured to open the waste material (corresponding to a material and a primary material) and separate the opened waste material into pulp fibers and a secondary waste material (corresponding to a secondary material); and a secondary separating unit 10b coupled to the lower side of the primary separating unit 10a and configured to further separate the secondary waste material into SAP and foreign matter, and pulp fibers. The primary separating unit 10a and the secondary separating unit 10b share a single case 20. That is, an interior space SP20 of the case 20 is partitioned by a partition member 26 into an upper space SP20u and a lower space SP20d adjacent to the lower side of the upper space SP20u. The upper space SP20u is mainly used as a part of the primary separating unit 10a, and the lower space SP20d is mainly used as a part of the secondary separating unit 10b. Incidentally, the secondary separating unit 10b corresponds to a main section of the "separating device" described in claim 1, and the primary separating unit 10a corresponds to the "opening mechanism" described in claim 7. Thus, it is also possible to say that the above-described separating device 10 is "the separating device configured such that the separating device of claim 1 is directly connected to the downstream side of the opening mechanism of claim 7".

The primary separating unit 10a is formed in a ceiling section 20c of the case 20, and includes: a charge port 22 through which the waste material is charged to the upper space SP20u while being made to ride on an airflow; a rotation member 30 housed in the upper space SP20u and configured to stir and open the waste material; a discharge port 24 though which pulp fibers in the waste material opened by the rotation member 30 is discharged from the interior of the upper space SP20u while being made to ride on an airflow; and a plurality of through holes h26, h26 . . . , formed in the aforementioned partition member 26, through which the secondary waste material is allowed to pass therethrough downward and be dropped to the secondary separating unit 10b of the lower space SP20d.

Here, the charge port 22 and the discharge port 24 are respectively connected to a charge duct 22d and a discharge duct 24d, and further the charge duct 22d and the discharge duct 24d are respectively connected to suitable blowers not shown. Further, the air volume per unit time (m$^3$/min) of the blower (corresponding to a second blower) of the discharge duct 24d is set to be greater than the air volume of the blower (corresponding to a first blower) of the charge duct 22d. Thus, the airflow basically flowing from the charge port 22 to the discharge port 24 is formed in the upper space SP20u. Then, the waste material is charged, for example, from an open pipe-end part (not shown) of the charge duct 22d, the waste material is sent from the charge port 22 to the upper space SP20u in the case 20 with the above-described airflow, and then is stirred/opened by the rotation member 30 in the upper space SP20u, and thereafter principally pulp fibers are discharged from the discharge port 24 with the airflow.

Further, when such stirring and opening are performed, the pulp fibers are gradually loosened into the form of threads, thereby being able to easily separating the SAP and foreign matter from the pulp fibers. Thus, these SAP and foreign matter mostly having specific gravities greater than the pulp fibers are dropped under their own weight and the like, in the upper space SP20u as the secondary waste material, thereby reaching the partition member 26 constituting the lower part of the upper space SP20u. Here, the partition member 26, as described above, includes the plurality of through holes h26, h26 . . . , and the through holes h26, h26 . . . are set to such a hole size as to allow the SAP and foreign matter serving as the secondary waste material to pass therethrough and restrain the pulp fibers from passing therethrough. Thus, such a secondary waste material passes through the through holes h26 and is sent to the secondary separating unit 10b of the lower space SP20d.

On the other hand, the secondary separating unit 10b includes the secondary waste material discharge mechanism 60 arranged to face the lower space SP20d at the lower position of the case 20. Then, the secondary waste material discharge mechanism 60 receives the secondary waste material falling in the lower space SP20d, and discharges it to the exterior, and in this discharge process, the secondary waste material is separated into SAP and foreign matter. Specifically, such secondary material includes a small amount of pulp fibers other than SAP and foreign matter. Thus, the secondary waste material discharge mechanism 60, while discharging the received secondary waste material to the exterior of the case 20, separates the secondary waste material into three things, which are SAP, foreign matter part, and pulp fibers.

Hereafter, each of the structures 20, 22, 24, 26, 30 and 60 are explained. It should be noted that, in the below description, three directions that are orthogonal with each other are referred to as an up-down direction, a front-rear direction, and a left-right direction. Namely, the up-down direction is directed in a vertical direction, and both the front-rear direction and the left-right direction are directed in a horizontal direction.

Figure 2A:
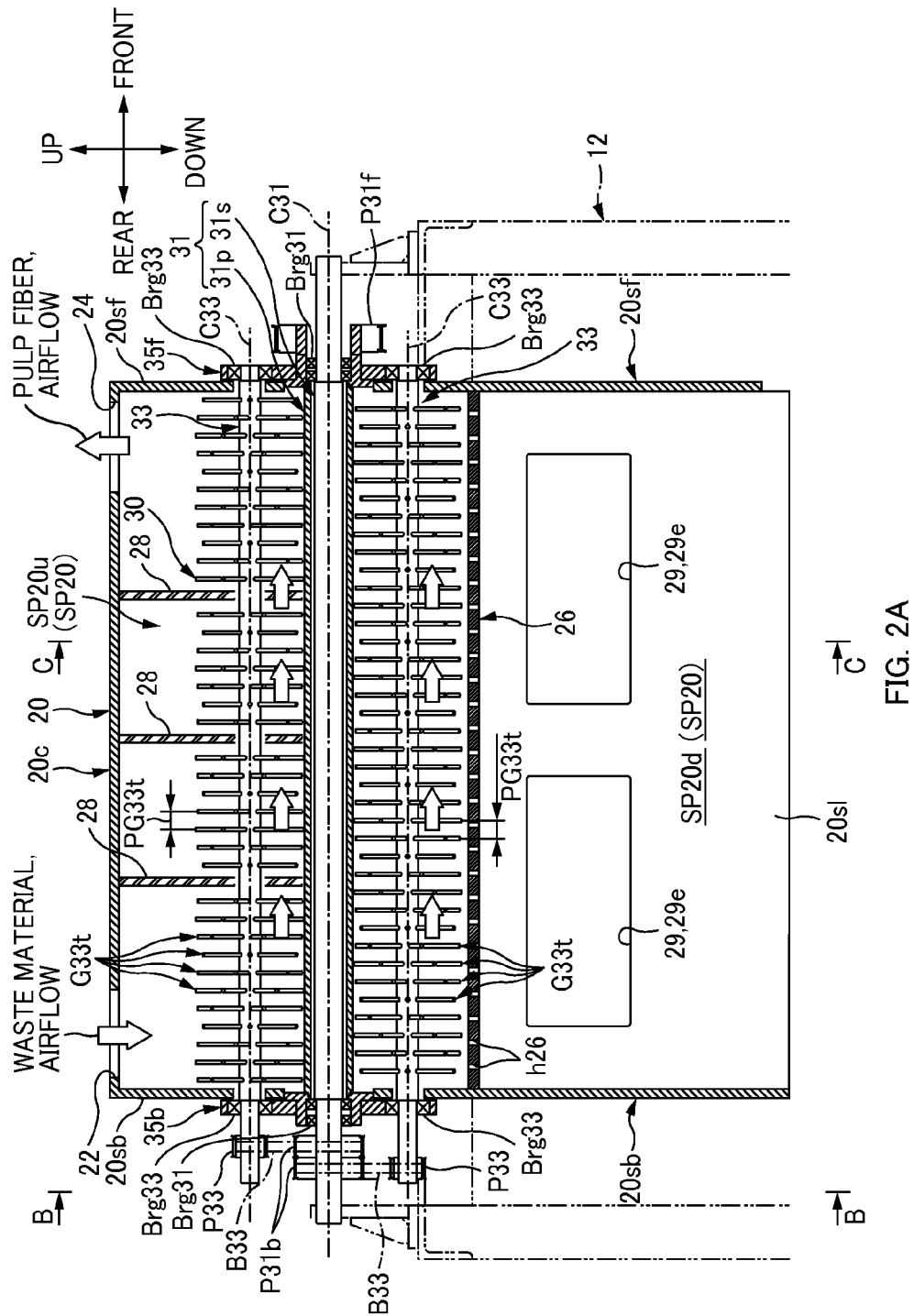
FIG. 2A is a schematic vertical sectional view showing mainly an enlarged upper half section of the separating device 10.
Figure 2B:
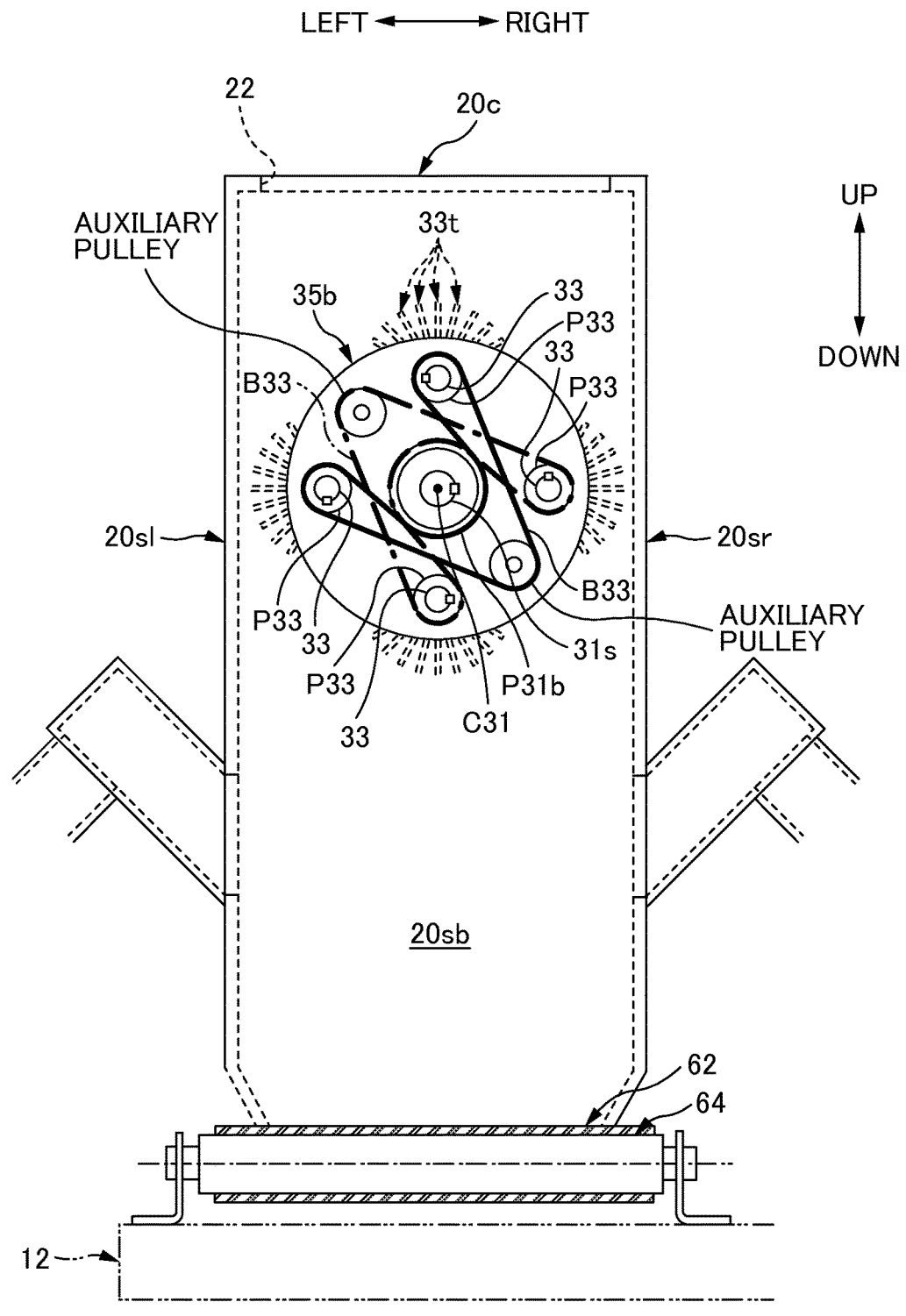
FIG. 2B is a B-B arrow view in FIG. 2A.
Figure 2C:
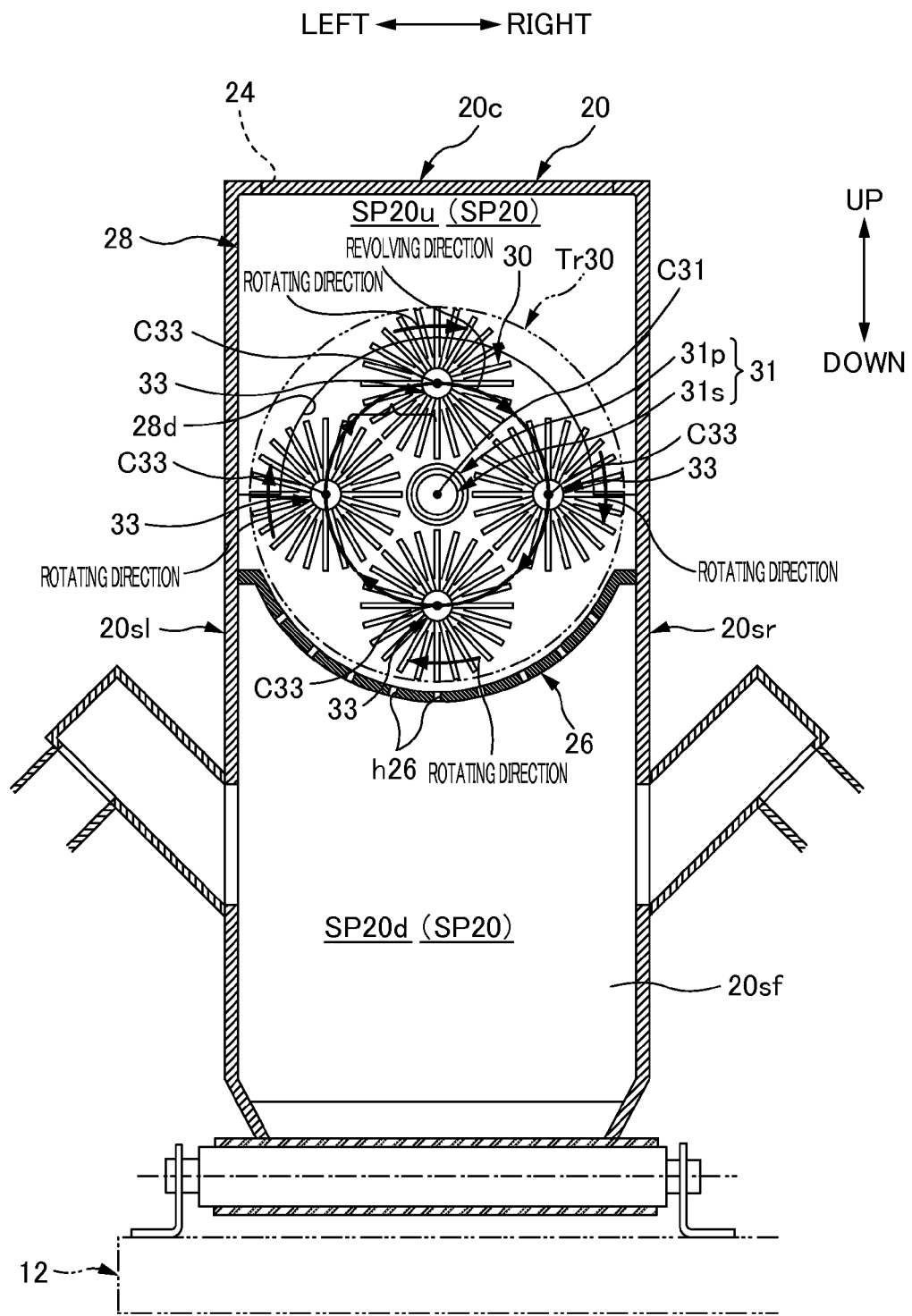
FIG. 2C is a C-C arrow view in FIG. 2A.

FIG. 2A is a schematic vertical sectional view showing mainly an enlarged upper half section of the separating device 10, FIG. 2B is a B-B arrow view in FIG. 2A, and FIG. 2C is a C-C arrow view in FIG. 2A.

<<Case 20, Charge Port 22, Discharge Port 24>>

As shown in FIG. 2A to FIG. 2C, the case 20 is a bottomless box body without just a bottom surface section, and its external shape is a substantially rectangular parallelepiped shape. In other words, the case has a ceiling section 20c provided substantially horizontally, and four side wall sections 20sf, 20sb, 20sl, and 20sr. The side wall sections each suspended from four sides of the front, rear, left, and right of the ceiling section 20c and from the four sides surround a space SP20 below the ceiling section 20c. It should be noted that, hereinbelow, a side wall section 20sf that is suspended from a front edge section of the ceiling section 20c is referred to as a "front side wall section 20sf", and a side wall section 20sb that is suspended from a rear edge section of the ceiling section 20c is referred to as a "rear side wall section 20sb", a side wall section 20sl that is suspended from a left edge section of the ceiling section 20c is referred to as a "left side wall section 20sl", and a side wall section 20sr that is suspended from a right edge section of the ceiling section 20c is referred to as a "right side wall section 20sr".

This case 20 is supported with an appropriate frame-like supporting member 12 fixed to a ground section GND of a factory, in a position with its longitudinal direction along the front-rear direction, and its transverse direction (width direction) along the left-right direction.

Note that, as shown in FIG. 2A, the charge port 22 is formed open in a substantially rectangular shape in a rear end part in the ceiling section 20c, and on the other hand the discharge port 24 is formed open in a substantially rectangular shape in a front end part in the ceiling section 20c. In this way, the direction from the charge port 22 to the discharge port 24 is set in parallel with the front-rear direction.

<<<Rotation Member 30>>>

As shown in FIG. 2A and FIG. 2C, the rotation member 30 has a revolving axis C31 set with an axial direction along and in parallel with the front-rear direction, and a plurality of shaft members 33, 33 . . . that rotate around rotating axes C33 set with the axial direction along and in parallel with the front-rear direction, while revolving around the revolving axis C31.

The revolving axis C31 is realized with a revolving axis forming shaft member 31 arranged with the axial direction along and in parallel with the front-rear direction. The revolving axis forming shaft member 31 has an outer pipe 31p arranged with a pipe axial direction in parallel with the front-rear direction, and an inner shaft 31s that is passed through substantially concentrically inward of the outer pipe 31p. The inner shaft 31s is supported in both ends with the frame-like supporting member 12 mentioned above so that it cannot move relatively, and on the other hand the outer pipe 31p is supported with the inner shaft 31s relatively rotatably around the axial core of the inner shaft 31s via a bearing Brg31. Further, the front end section in the front-rear direction of the outer pipe 31p is fixed with a circular flange board 35f via an appropriate connecting structure relatively non-movably and substantially concentrically, and this flange board 35f is provided to come in contact with the front side wall section 20sf of the case 20 from the front in an adjacent manner. Similarly, the rear end section of this outer pipe 31p is fixed with the circular flange board 35b relatively non-movably and substantially concentrically via an appropriate connecting structure, and the flange board 35b is provided adjacently so as to come in contact from the rear to the rear side wall section 20sb of the case 20. Then, this pair of flange boards 35f, 35b supports both ends of each of the shaft members 33, 33 . . . rotatably via bearings Brg33 in a state that the axial direction is facing in parallel with the front-rear direction.

On the other hand, the above flange board 35f positioned in the front end section of the outer pipe 31p is fixed with a pulley P31f, and this pulley P31f is to be input with a rotation operation via an endless belt B31 (FIG. 1C) from a pulley P37 of an electric motor 37 as a drive source. Further, as shown in FIG. 2A and FIG. 2B, from the above flange board 35b positioned in the rear end section of the outer pipe 31p, the rear end section of each of the shaft members 33 is protruded to the rear, and each rear end section is fixed with the pulley P33, and further a pulley P31b is fixed to the inner shaft 31s corresponding to these pulleys P33. Then, an endless belt B33 is put around the corresponding pulleys P33 and P31b.

Thus, in the case that the electric motor 37 is activated, the outer pipe 31p and the pair of the flange boards 35f, 35b integrally rotate, and accompanying this, each of the shaft members 33, 33 . . . supported with the pair of the flange boards 35f, 35b are applied with a rotating force from this pair of the flange boards 35f, 35b, and revolve around the revolving axis C31 which moves around the outer pipe 31p. Then, at this time, the endless belt B33 is put around both the pulley P33 and the pulley P31b, and thus with the revolution of each of the shaft members 33, each of the shaft members 33 rotates for the amount of change of the revolving position. Thus, using one electric motor 37 as the drive source, the rotating operation and the revolving operation of each of the shaft members 33 is performed.

Figure 3:
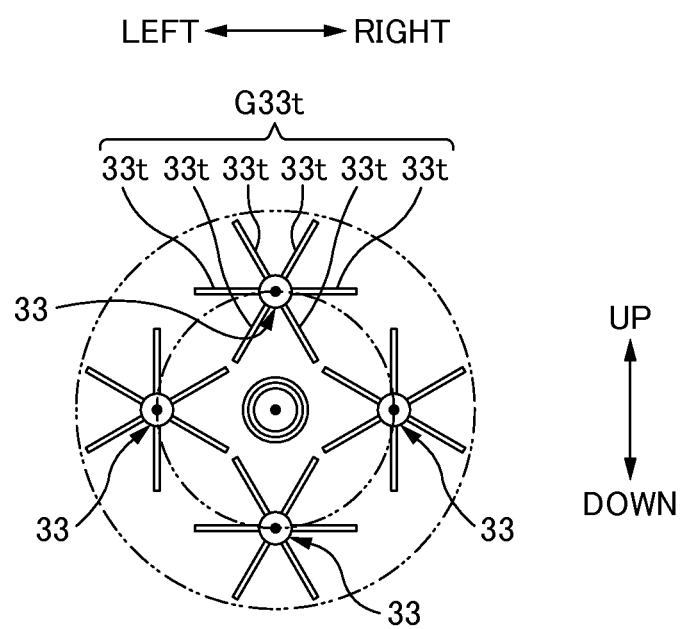
FIG. 3A is a view of a single protruding section group G33t of a shaft member 33 seen from a front-rear direction.

By the way, in this example, as shown in FIG. 2C, four shaft members 33, 33 . . . as an example of a plurality of members, are provided lined in 90 degrees intervals of an equal pitch in the revolving direction. Further, each of the shaft members 33 has a protruding section group G33t with a plurality of protruding sections 33t, 33t . . . such as shown in FIG. 3 arranged radially in 60 degrees intervals of an equal pitch in the rotating direction. Then, the protruding section group G33t is, as shown in FIG. 2A, provided in a predetermined pitch in a plurality of positions in the axial direction of the shaft member 33. Thus, a hitting frequency of the waste material with the protruding sections 33t can be increased, and high opening performance can be performed.

Further, in this example, each of the protruding sections 33t is configured with stick-like members 33t with the same length as each other arranged standing on the peripheral surface of the shaft member 33, and in more detail, a steel round bar with a circular cross section is used as the stick-like member 33t, and further, its longitudinal direction is facing outward in an intersecting direction of the axial direction of the shaft member 33. The waste material is hit with the peripheral surface of the stick-like member 33t.

Thus, the surface area that hits the waste material can be largely secured. Further, with the stick-like member 33t, a space to take in the waste material can be largely secured in between the adjacent stick-like members 33t, 33t. However, the stick-like member 33t is not limited to the above steel round bar in any way, and may be, for example, a steel square bar with a rectangular cross section, or may be a non-ferrous round bar. Further, the protruding section 33t does not have to be configured as the stick-like member 33t, and for example, may be configured as a plate-like member. However, with the stick-like member 33t, a larger space can be secured to take in the waste material as described above, and thus is more preferable than the plate-like member.

Further, in this example, the longitudinal direction of the stick-like member 33t is orthogonal to the axial direction of the shaft member 33, but it is not limited thereto in any way. In other words, even if the directions are not orthogonal but intersect with each other, a reasonable hitting performance can be performed.

Further, as can be seen from a comparison between FIG. 3 and FIG. 2C, or from FIG. 2A, preferably, the protruding section groups G33t, G33t that are adjacent to each other in the axial direction of the shaft member 33, the arrangement positions of the protruding sections 33t to each other are shifted in the rotating direction. In this example, with respect to the protruding section group G33t that is a predetermined standard, the arrangement positions of the protruding sections 33t of the protruding section group G33t positioned adjacent thereof is shifted in the rotating direction by 15 degrees, and further, the protruding section group G33t positioned adjacent thereof is further shifted with a same shifting amount of 15 degrees in the same direction, and this shifting operation is performed repeatedly with respect to all the protruding section groups G33t, G33t . . . lined in the axial direction.

Then, when configured in this way, immediately after the protruding sections 33t belonging to the predetermined protruding section group G33t hit the waste material, the protruding sections 33t belonging to the protruding section group G33t positioned adjacent in the axial direction can hit again this waste material, and as a result the hitting frequency of the waste material can be increased.

Namely, as described above in reference to FIG. 3, each of the protruding section groups G33t has the protruding sections 33t in 60 degrees intervals in the rotating direction, thus with the above described shifting operation of 15 degrees, the protruding section group G33t with the same arrangement positions of the protruding sections 33t appears for every four sections (in other words, in a ratio of one to four) as shown in FIG. 2A.

The shifting amount, however, is not limited to the above 15 degrees in any way, and may be an arbitrary angle, and further, does not have to be shifted with the same shifting amount in the same direction regularly as described above, and for example, one or both of the shifting direction and the shifting amount may be random.

Further, preferably, as shown in FIG. 2A, regarding the shaft members 33, 33 adjacent to each other in the revolving direction, the arrangement positions of the protruding section groups G33t to each other may be shifted in the axial direction to each other. In this example, the shaft members 33, 33 that are adjacent to each other are both provided with the protruding section groups G33t, G33t . . . with a same pitch PG33t in the axial direction, and due to this, the adjacent shaft members 33, 33 are arranged alternately to each other so that the protruding section group G33t of the shaft member itself is positioned in a middle position between the protruding section group G33t belonging to the other shaft member 33 and the protruding section group 33t adjacent thereof in the axial direction.

Then, with a configuration as described above, immediately after the protruding sections 33t of the protruding section group G33t of the predetermined shaft member 33 hit the waste material, the protruding sections 33t of the protruding section group G33t of the shaft member 33 positioned adjacent in the revolving direction can again hit the waste material, and this also contributes effectively in the increase of the hitting frequency of the waste material described above.

In other words, in FIG. 2A, it is difficult to show both the adjacent shaft members 33, 33, and thus for the sake of convenience, the positions of the protruding section groups G33t are shown to be alternate between the shaft member 33 positioned above and the shaft member 33 positioned below, but in reality both the two upper and lower shaft members 33, 33 shown in FIG. 2A are in an adjacent positional relationship to each other in the revolving direction. In other words, the shaft members are in an adjacent positional relationship with a 90 degrees interval in the revolving direction.

Further, preferably, as shown in FIG. 2C, between the revolving direction of the shaft member 33 and the rotating direction of the shaft member 33, the rotation directions of each other are the same. For example, in the case that the revolving direction is a clockwise direction, corresponding to this, the rotating direction is also made clockwise. On the contrary, in the case that the revolving direction is counterclockwise, the rotating direction may also be counterclockwise. Thus, in this way, with a high speed value that is formed by adding a speed value of revolution of the shaft member 33 and a speed value of rotating on its own axis of the shaft member 33t, the protruding sections 33t hit the waste material. Thus, the hitting force to the waste material can be increased, and this also contributes to improvement of the opening performance.

Figure 4:
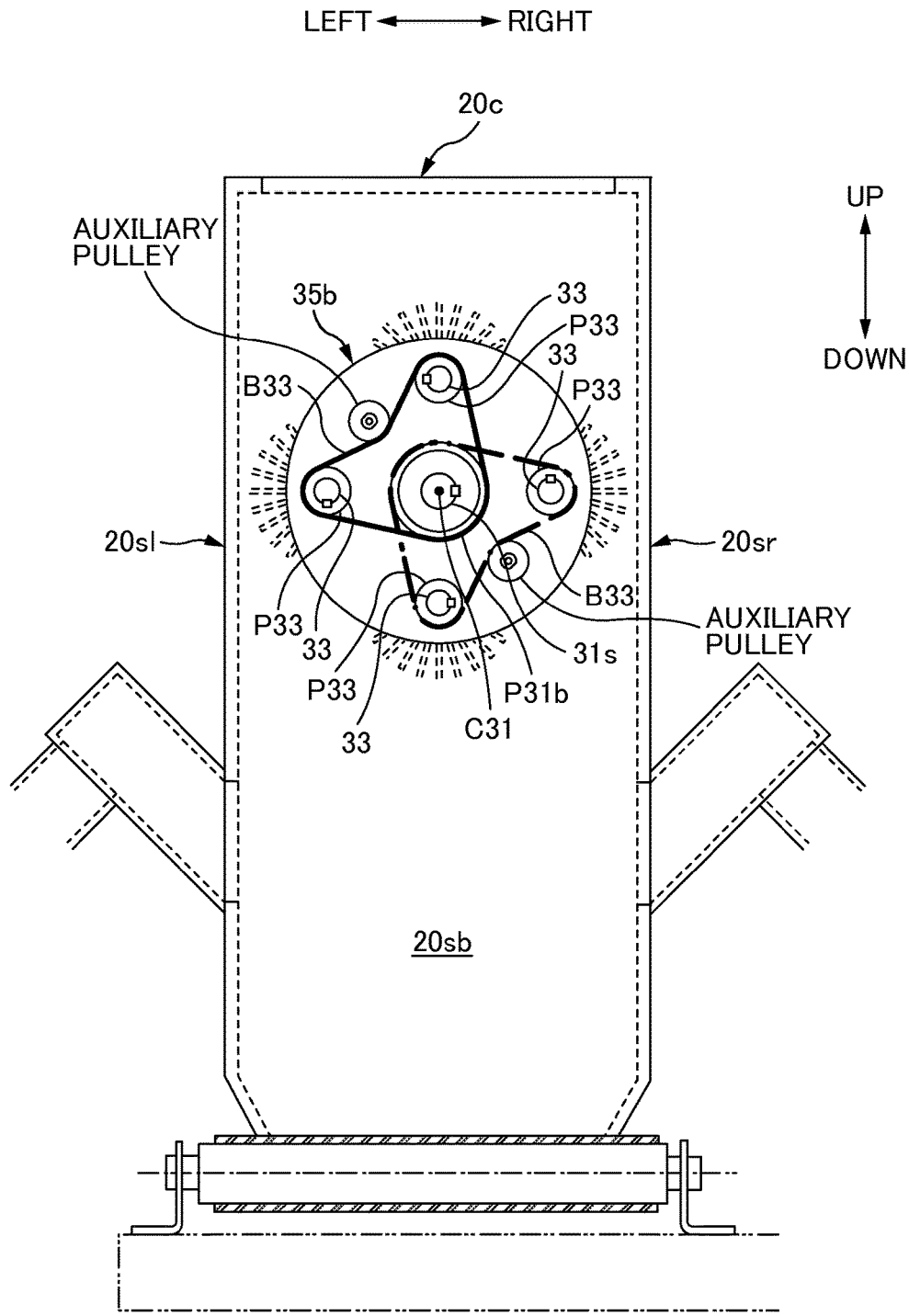
FIG. 4 is a view showing an example of how an endless belt B33 is wound around in the case where rotation directions are opposite to each other between a revolving direction and a rotating direction of the shaft member 33.

It should be noted that, to align the rotation directions of each other to a same direction as described above is realized by devising a way to put the endless belt B33 around the pulleys P33, P31b as in FIG. 2B. In other words, as shown in FIG. 2B, in the case that the endless belt B33 is put around so that one pulley of either the pulley P33 of the shaft member 33 or the pulley P31b of the inner shaft 31s is made to come into contact with an inner peripheral surface of the endless belt B33, and the other pulley is made to come in contact with an outer peripheral surface of the endless belt B33, unifying of the above rotation directions will be realized. In other words, in the case that supposedly between the revolving direction of the shaft member 33 and the rotating direction of the shaft member 33, the rotation directions to each other are to be reversed, as shown in FIG. 4, the endless belt may be put around so that both the pulley P33 of the shaft member 33 and the pulley P31b of the inner shaft 31s come into contact with the inner peripheral surface of the endless belt B33.

<<<Partition Board 26>>>

As described above, inside the case, the partition board 26 (corresponding to a partition member) is provided, and by this partition board 26, the interior space SP20 of the case 20 is partitioned into the upper space SP20u and the lower space SP20d.

This partition board 26 is bent in an arc shape protruded below as shown in FIG. 2C. Thus, the partition board is provided along a rotation path Tr30 of the rotation member 30, namely along a rotation path Tr30 drawn with a tip end section of the protruding section 33*t* with the revolving and rotating of the shaft member 33, and as a result, a distance with respect to this rotation path Tr30 can be maintained substantially constantly over the entire length in the arc direction.

Further, various specifications such as an opening shape, an opening area, and the arrangement pattern of the through holes h26 formed in the partition board 26 are determined according to the position in the front-rear direction. Thus, in this example, two types of partition boards 26 with specifications of the through holes h26 different from each other are prepared as one example of a plurality of kinds of examples.

For example, as shown in FIG. 2A, an unopened block or granular waste material, riding on the airflow facing downward from the charge port 22, reaches the partition board 26 provided in a rear position opposing the charge port 22. Thus, in this rear position, for the purpose of certainly catching this waste material, there is provided a partition board 26 with a small opening ratio of the through holes h26 (a ratio of an area of the through holes h26 that occupy a plate surface of the partition plate 26 (includes the area of the through holes h26)), and that is set with a small opening area of each of the through holes h26. Specifically, in consideration that such as the granular diameter of the SAP is 150 to 850 µm, the partition board 26 formed with a plurality of circular holes with a diameter of 5 mm±1 mm with an opening ratio of 40 to 50% and in a staggered arrangement is used. In other words, a lower limit value of the above diameter is determined from the viewpoint of preventing clogging.

On the contrary, in a front position in which the discharge port 24 opposes, opening of the waste material with the rotation member 30 is progressed sufficiently, thus it is easy to separate the SAP and the foreign matter from the pulp fibers of the waste material, and further, the pulp fibers are not in a block or granular state and are sufficiently loosened to a string-state, and this pulp fiber tends to easily rise with the airflow.

Thus, even if the opening ratio and the opening area are made slightly large for the through holes h26 of the partition board 26 provided in this front position, passing through of the pulp fibers are suppressed, thus to facilitate passing through of the SAP and the foreign matter blown to the partition board 26 by springing off from the sticklike members 33*t* of the rotation member 30, the opening ratio of the through holes 26 are set larger than the partition board 26 in the rear position described above, and the opening area of the through holes h26 are set larger than the round holes of the partition board 26 in the rear position.

Figure 5A:
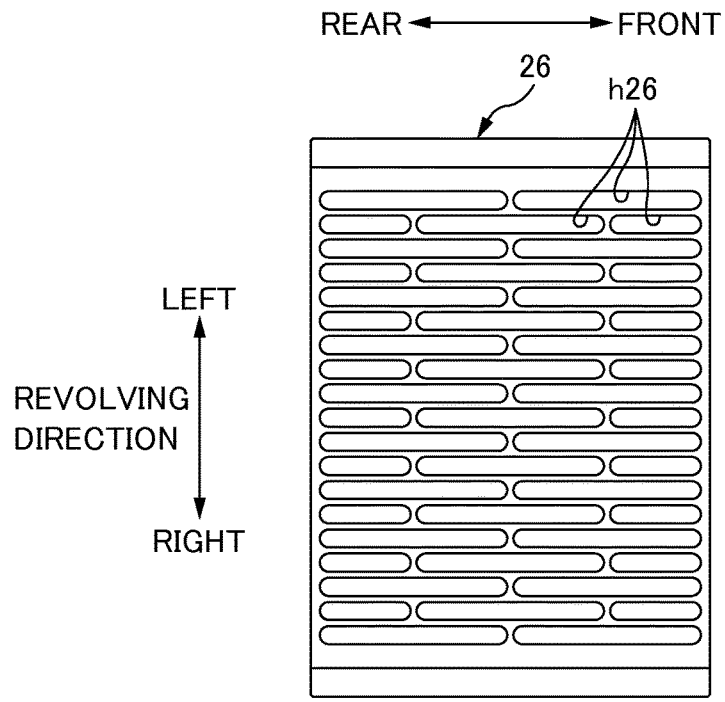
FIG. 5A is a schematic developed view of a sectional arc-shaped partition board 26 arranged in each of a front position and an intermediate position in an interior space SP20 inside a case 20.

Further, in order for the pulp fibers loosened to a string-like state to be easily caught in the through holes h26, the shape of the through holes h26 is set as long holes having a longitudinal direction and a transverse direction (width direction) as shown in a substantially developed view of FIG. 5A, and the longitudinal direction of the through holes h26 is in a direction intersecting the revolving direction of the rotation member 30 (to be accurate, a direction formed by projecting the revolving direction on a board surface of the partition board 26). Specifically, this partition board 26 is formed with long holes having a length 30 to 155 mm×a width 5 to 35 mm and having a size in which the length is greater than the width, the long holes having an opening ratio of 50% to 65%, the opening ratio being greater than the opening ratio of the partition board 26 in the above rear position, the holes being in a staggered arrangement with the longitudinal direction being orthogonal to the revolving direction.

Figure 5B:
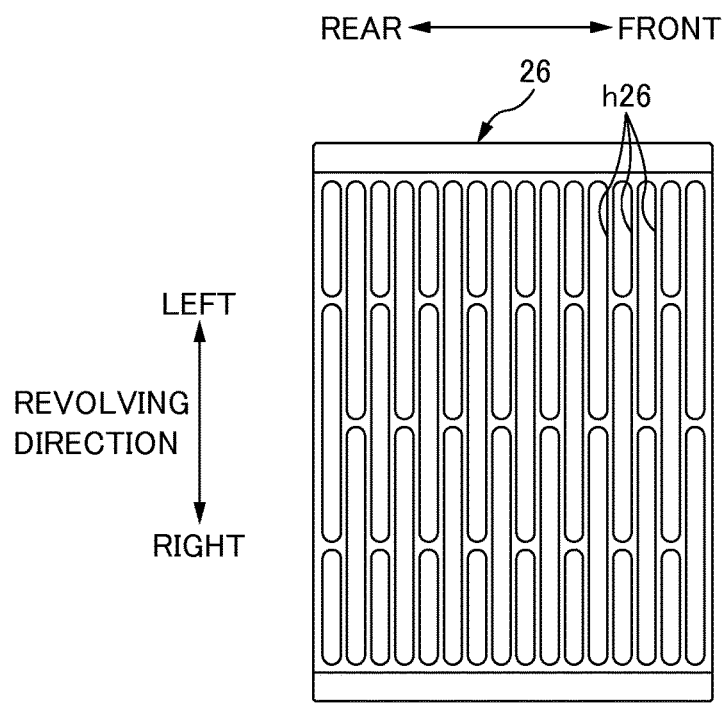
FIG. 5B is a schematic developed view of a sectional arc-shaped partition board 26 having long holes as through holes h26 whose longitudinal direction is in parallel with the revolving direction.

In other words, as shown in the substantially developed view in FIG. 5B, the reason that the pulp fibers become easy to pass through the long holes, in the case that the longitudinal direction of the long holes which are the through holes h26 do not intersect the revolving direction (to be accurate, a direction formed by projecting the revolving direction on the board surface of the partition board 26), in other words, in the case that the longitudinal direction of the long holes are in parallel with the revolving direction, is considered as follows. First, the pulp fibers that have been sufficiently opened are loosened and are in a string-like state, so that as compared to the case of being in a block or a granular state, it is difficult for the pulp fibers to pass through the long holes which are the through holes 26. In such a case, however, in the case that the longitudinal direction of the long holes are in parallel with the revolving direction, the pulp fibers which have a tendency to flow in the revolving direction with the revolution of the rotation member 30 have a long time facing the long holes, and as a result easily pass the long holes. In other words, when the longitudinal direction of the long holes are made to be in parallel with the revolving direction, the size of the long holes in the direction in parallel with the revolving direction becomes large, and the pulp fibers become easy to pass the long holes.

The shape of the through holes h26, however, are not limited in any way to the long holes with the longitudinal direction in parallel with the front-rear direction such as shown in FIG. 5A. In other words, in some cases, the shape of the through holes h26 may be long holes with the longitudinal direction in parallel with the left-right direction (revolving direction) as in FIG. 5B described above, or may have an opening shape with a square hole, or further may have an opening shape with holes of a polygon-shape or a round hole other than a rectangle.

Further, in this example, the partition board 26 is formed as a size with an entire length of the case 20 in the front-rear direction divided into three. The partition board 26 with the former round holes is arranged in the rear position, and both the middle position, between the front position and the rear position, and the front position are arranged each with the partition board 26 with the latter long holes. The arrangement pattern of the partition board 26 however, is not limited to this in any way.

<<<Secondary Waste Material Discharge Mechanism 60>>>

As shown in FIG. 1A to FIG. 1C, the secondary waste material discharge mechanism 60 has a belt conveyor supported with the above described frame-like supporting member 12 as a main body. In other words, the secondary waste material discharge mechanism 60 includes an endless belt 62, serving as a belt member, with an upper surface as a transporting surface, a plurality of rollers 64, 64 around which the endless belt 62 is wound and which defines a circulating path of the endless belt 62. At least one of these rollers 64, 64, is a drive roller that is driven to be rotated by a power motor serving as a driving source, and the endless belt 62 circulates with the drive roller.

The upper surface which is the transporting surface of the endless belt 62 is set to substantially a horizontal surface, and the upper surface is positioned to oppose a lower end opening of the case 20 and to cover the entire surface of the lower end opening from below. Thus, the endless belt 62 receives, on the upper surface thereof, objects that fall in the lower space SP20*d* of the case 20 as a secondary waste material. Further, the movement direction of the upper surface of the endless belt 62 is to the front in the front-rear direction. Thus, the received secondary waster material is moved to the front by the endless belt 62.

Here, a gap G is provided between the upper surface of the endless belt 62 and a lower end edge section of the front side wall section 20sf (corresponding to a wall section positioned on the downstream side of the moving direction of the belt member among the wall sections of the case) of the case 20, however, a gap is not provided between the upper surface of the endless belt 62 and each of the lower end edge sections of the rear side wall section 20sb, the left side wall section 20sl and the right side wall section 20sr, and they are made to abut against each other. In other words, these lower end edge sections are made to slide on the upper surface of the endless belt 62. Further, based on such as a difference in an airflow amount between the above described charge port 22 and the discharge port 24, the interior space SP20 (SP20d) in the case 20 is maintained in a negative pressure condition with an atmospheric pressure lower than that of the outside. Thus, the outside air enters in the lower space SP20d from the above gap G as an airflow flowing to the rear, and this incoming outside air also effectively contributes to separation of the secondary waste material into two, which are the pulp fibers, and the SAPs and foreign matter.

Figure 6A:
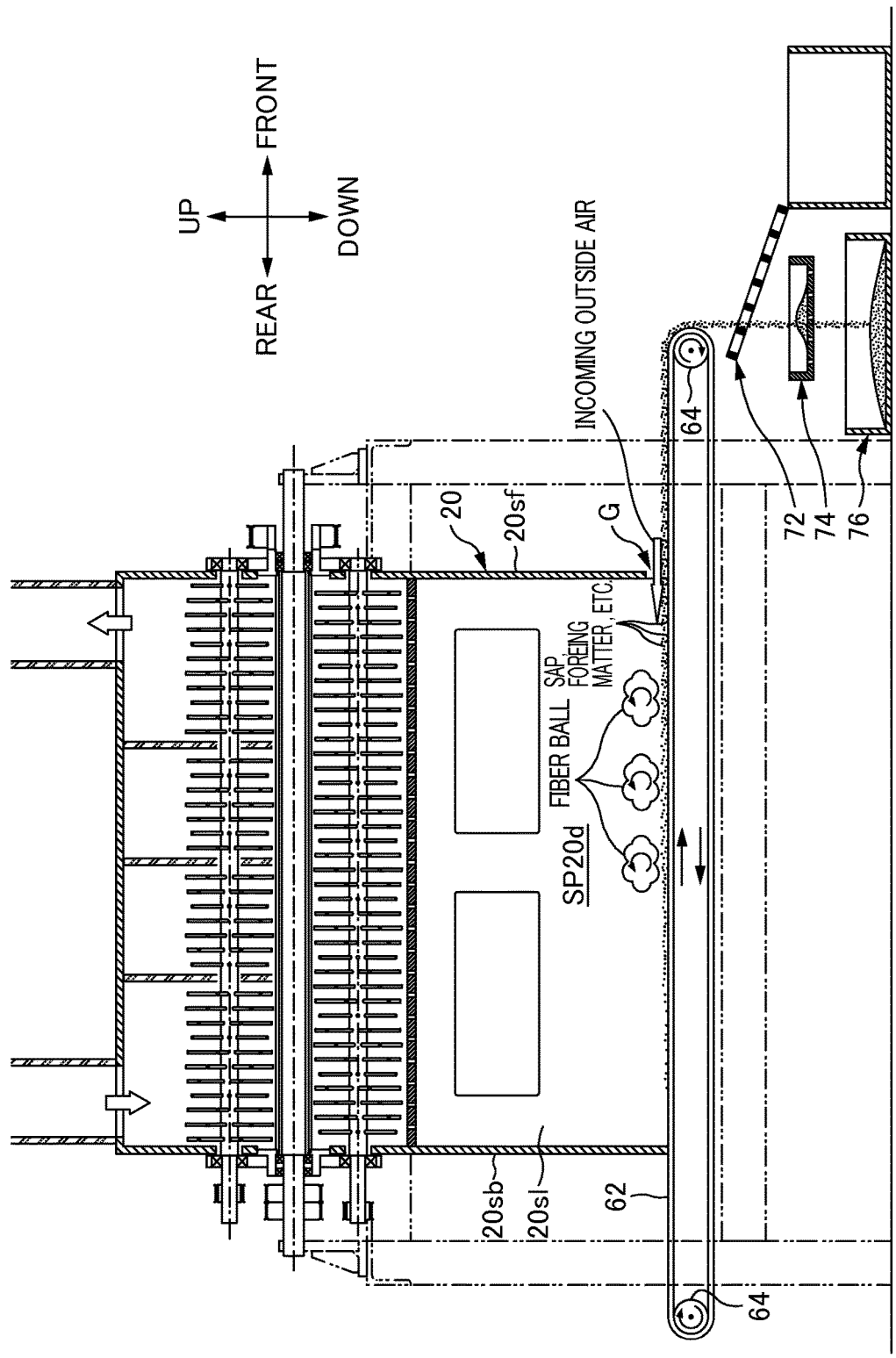
FIG. 6A is a schematic vertical sectional view showing a manner in which incoming outside air from a gap G of the case 20 separates a secondary material into two which are pulp fibers, and SAP and foreign matter.
Figure 6B:
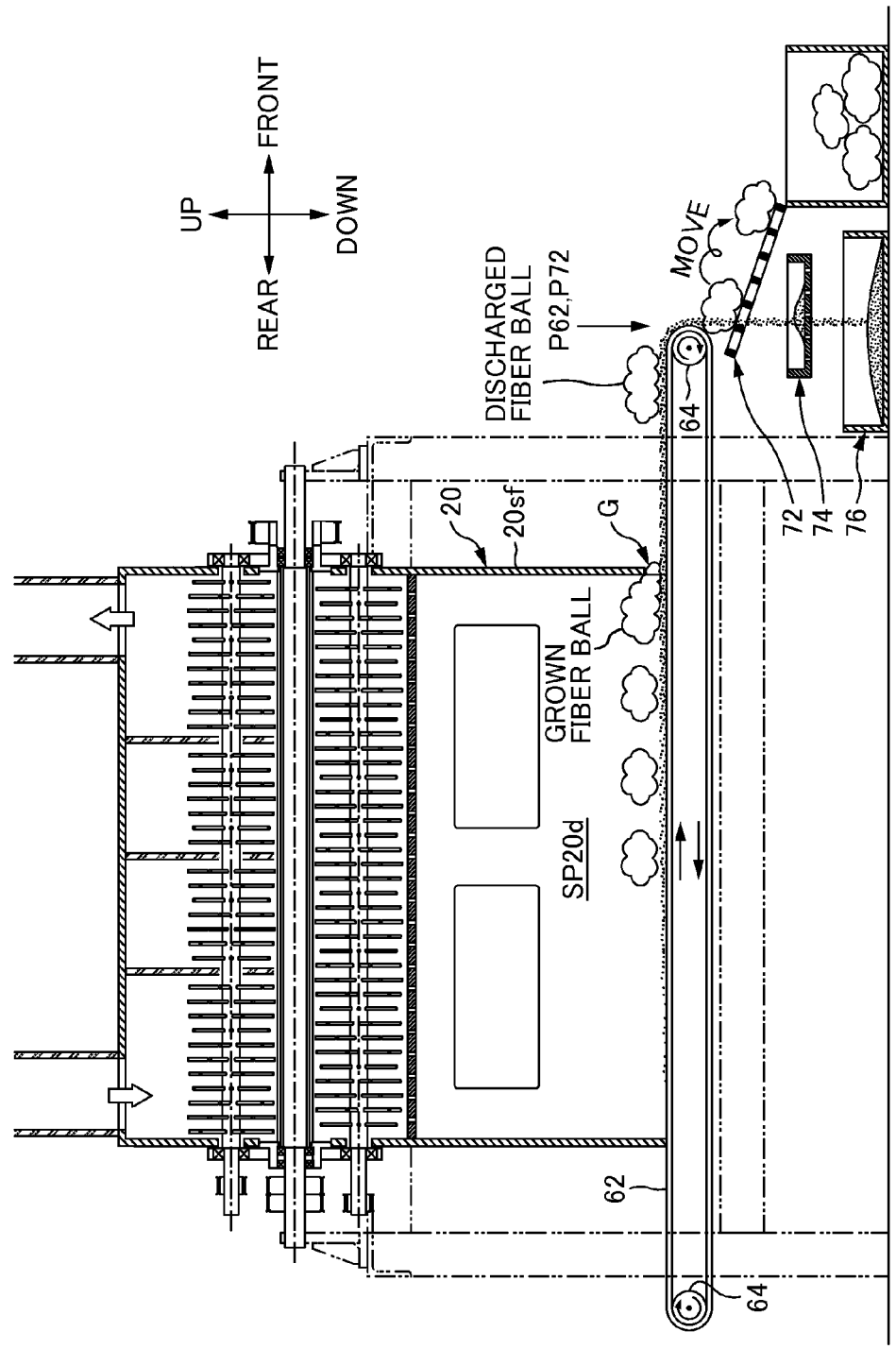
FIG. 6B is a schematic vertical sectional view showing a manner in which fiber balls formed inside the case 20 by incoming outside air is ejected outside the case 20, and is captured by a first sieve member 72.

FIG. 6A and FIG. 6B are explanatory views showing the manner of such separation, and both the figures are shown in a schematic vertical cross sectional view. As shown in FIG. 6A, first, the above mentioned gap G is positioned to the front that is on the downstream side of the movement direction of the endless belt 62 with respect to the position where the SAPs and foreign matter falls onto the endless belt 62, and from this gap G, the incoming outside air in the direction toward the rear flows into the inside of the case 20. Then, by the movement of the endless belt 62, the SAPs and foreign matter are sent to the front that is on the downstream side of the movement direction. At this time, the pulp fibers, which are smaller in specific gravity than the SAPs and foreign matter, are restrained from moving to the front by the above mentioned incoming outside air flowing toward the rear, and thereby the pulp fibers are rolled mainly on the upper surface of the endless belt 62 and fiber balls are formed. Then, in this way, only the SAPs and foreign matter are sent to the front while only the fiber balls remaining inside the case 20, and as a result, the secondary waste material is separated into two, which are the pulp fibers, and the SAPs and foreign matter.

Then, this can indicates that the gap G functions as an airflow supply mechanism configured to form the flow of the incoming outside air directed backward, namely, an airflow in the direction opposite to the movement direction of the endless belt 62, in cooperation with the above mentioned two blowers (corresponding to negative pressure condition forming mechanisms) configured to form a negative pressure condition inside the case 20.

It should be noted that, as shown in FIG. 6B, such fiber balls grow into a snowball form while entangling and intertwining the surrounding pulp fibers in a rolling process. Then, the fiber balls having grown to the size corresponding to the above mentioned gap G are caught between the upper surface of the endless belt 62 and the lower end edge section of the front side wall section 20sf of the case 20 and jammed at the gap G, the incoming outside air weakens, and the friction between the fiber balls and the endless belt 62 increases and the like, thus the movement power to the front applied from the endless belt 62 increases relatively, and thus the fiber balls may be discharged to the outside of the case 20 from the gap G. In such a case, the fiber balls in such a large form are sent to a turning position P62 of the endless belt 62.

Thus, in this embodiment, for the purpose of separating the fiber balls discharged the outside the case 20 from the SAPs and foreign matter, a first sieve member 72 (corresponding to a sieve member) is arranged below the endless belt 62 corresponding to the turning position P62 of the endless belt 62. Such first sieve member 72 has a plurality of through holes h72, h72 . . . and the opening size of the through holes h72 is set to such an opening size allowing the SAPs and foreign matter to pass therethrough and regulating the passage of the fiber balls of the pulp fibers. For example, the first sieve member 72 includes a metal mesh, and the metal mesh has rectangular openings each having a length 20 to 30 mm×a width 20 to 30 mm, as the above mentioned through holes h72. Thus, the fiber balls of the pulp fibers are selectively captured by the first sieve member 72. Incidentally, when the opening size is set smaller than 20 mm, the foreign matter is captured by the metal mesh and easily contained in the pulp fibers, whereas, on the other hand, when it is set greater than 30 mm, the pulp fibers are poorly captured by the metal mesh and separation becomes difficult.

Further, a second sieve member 74 (corresponding to a second sieve member) is arranged below this first sieve member 72 for the purpose of separating the SAPs and foreign matter passing through the first sieve member 72 into the SAPs and the foreign matter. Such second sieve member 74 also has a plurality of through holes h74. Then, the opening size of the through holes h74 is set to such an opening size allowing the SAPs to pass therethrough and regulating the passage of the foreign matter. For example, the second sieve member 74 also includes a metal mesh, and the metal mesh has rectangular openings each having a length 1.5 to 2 mm×a width 1.5 to 2 mm, as the above mentioned through holes h74. Thus, the foreign matter is selectively captured by the second sieve member 74, and the SAPs passing through it and falling into a lidless container 76 and collected. Incidentally, when the opening size is set smaller than 1.5 mm, the SAPs poorly pass through the through holes h74, and are captured and easily accumulated by the metal mesh, whereas, on the other hand, when it is set greater than 2 mm, the foreign matter is poorly captured by the metal mesh and contained in the SAPs and separation becomes difficult.

It should be noted that, preferably, the first sieve member 72 has a transporting mechanism configured to transport the fiber balls, which have been restrained from passing through the first sieve member 72 and captured, to a position away from a landing position P72 at the first sieve member 72. For example, in the example in FIG. 6B, a tabular metal mesh 72 is used as the first sieve member 72, and this metal mesh 72 is arranged inclined so that its front end section on the upper surface is lower than the rear end section, thus functioning as the above described transporting mechanism. In other words, the fiber balls that have dropped on the upper surface of the metal mesh 72 which is the first sieve member 72 roll to the front due to the inclination gradient of the upper surface of the metal mesh 72, and thus the fiber balls are moved further forward than the landing position P72. Thus, it can be effectively prevented that, on the fiber balls having been captured with the first sieve member 72, the SAPs and the foreign matter, having dropped from the turning position P62 thereafter, accumulates and the sifting effect is decreased.

The transporting mechanism, however, is not limited to that described above in any way. For example, as the first sieve member 72, the endless belt (not shown) of the metal mesh form is used, and then by circulating and driving the endless belt in the metal mesh form, the fiber balls that have dropped on and that have been captured with the endless belt may be sent to the front.

By the way, preferably, as shown in FIG. 2A, regulating members 28 that regulate movement of the waste material from the charge port 22 to the discharge port 24 may hang from the ceiling section 20c of the case 20, in predetermined positions in the front-rear direction in the upper space SP20u in the case 20. In the example in FIG. 2A, these regulating members 28 are arranged in three positions in the front-rear direction with intervals between them, and thus the space of the upper space SP20u above the rotation member 30 is divided into four zones. Specifically, each regulating member 20 is a plate-like regulating board 28, and the thickness direction is faced in the front-rear direction, and is arranged to divide the upper space SP20u across the entire length in the left-right direction. Further, as shown in FIG. 2C, the shape of the lower end edge section of each regulating board 28 is an arc-shaped recessed shape corresponding to a rotation path Tr30 drawn by the protruding sections 33t of the shaft member 33 of the rotation member 30, and a lower end edge section 28d of the regulating board 28 is overlapped with the rotation path Tr30 of the tip end section of the protruding sections 33t in the up-down direction.

Thus, a reliable extension of a holding time of the waste material in the case 20 can be achieved, and a long holding time can be secured. Then, in this way, opening of the waste material can be progressed to a sufficient level, and as a result, separation performance of the pulp fibers from the waste material can be improved, and the pulp fibers can be collected with high purity.

By the way, as has been described in FIG. 2A, in this example, with regard to the shaft members 33, 33 adjacent to each other in the revolving direction among the four shaft members 33, 33 . . . of the rotation member 30, the arrangement positions of the protruding section groups G33t to each other are shifted in the axial direction. Thus, in this example, with respect to two shaft members 33, 33 of these four shaft members 33, 33 . . . , specific protruding section groups G33t are in positional relationships that interfere with the regulating boards 28. For example, in FIG. 2A, there was a possibility of a predetermined protruding section group G33t of the shaft member 33 shown to the upper side interfering with the regulating boards 28. Then, in this example, the protruding section groups G33t that interfere with the regulating boards 28 were taken off from the shaft members 33. Such interference prevention measure is not limited to the above in any way, and for example, with increase in arrangement pitch in the axial direction of the protruding section groups G33t and by devising a method of making the thickness of the regulating boards 28 thinner and the like, the regulating boards 28 can be appropriately placed in a space between the protruding section groups G33t, G33t adjacent to each other in the front-rear direction, then the protruding section groups G33t do not have to be taken off.

Further, as described above, the number of setting the regulating boards 28 is three, but it not limited to three as described above in any way, and may be one or two, or equal to or more than four.

Further, as described above, the regulating board 28 which is made of one board is exemplified as each regulating member 28, but it is not limited to this in any way. In other words, each regulating member 28 may be configured with a plurality of members. For example, as the regulating member 28, such a regulating member 28, may be used, that includes a plurality of sticklike members (not shown) hanging from the ceiling section 20c along the longitudinal direction downwards, and that is configured such that the sticklike members are arranged in a comb-like manner at intervals between the sticklike members adjacent in the left-right direction.

Further, preferably, as shown in FIG. 1A and FIG. 1B, a suction port 29 through which air in the lower space SP20d is suctioned may be provided. Then, in this way, the pulp fibers that have passed through the through holes h26, h26 . . . of the partition board 26 and that are floating in the lower space SP20d can be suctioned in together with air through the suction port 29, and as a result a collection rate of the pulp fiber can be increased.

In the example in FIG. 1A and FIG. 1B, the suction ports 29, 29 . . . are formed in parts, in the left side wall section 20sl and the right side wall section 20sr of the case 20, opposing the lower space SP20d from the sides. Further, the suction ports 29 are formed arranged in the front-rear direction in twos as one of a plurality of examples, with respect to each of the left side wall section 20sl and the right side wall section 20sr.

Then, by providing two suction ports 29, 29 arranged in the front-rear direction in this way, a suction force distribution in the front-rear direction can be made uniform, and generation of a stagnation point in the lower space SP20d and the like can be prevented, and as a result a malfunction such as the pulp fiber accumulating in a specific position in the lower space SP20d can be effectively prevented.

Further, the suction ports 29 are provided in the side wall portions 20sl, 20sr, and so the air in the lower space SP20d is sucked in from substantially the sides through the suction ports 29. Thus, the SAPs and the foreign matter that have dropped downwards in the lower space SP20d and that have accumulated on the endless belt 62 of the secondary waste material discharge mechanism 60 are generally not sucked in through the suction ports 29, and the pulp fibers floating in the air of the lower space SP20d can exclusively be sucked in. Then, in this way, the pulp fibers can be collected with high purity from within the lower space SP20d.

These suction ports 29 attached to these side wall sections 20sl, 20sr can be realized by connecting tip sections 29de of the suction ducts 29d provided outward of the case 20 as shown in FIG. 1B to each of the rectangular opening sections 29e formed through each of the side wall sections 20sl, 20sr. It should be noted that, each suction duct 29d is connected with a blower (not shown) via an appropriate intermediate pipe member 29m such as a hose, and in this way, the air can be sucked in from the above pipe end section.

Further, with suction of the air from the suction ports 29, the negative pressure level in the case 20 is increased, and the suction amount of air with the suction ports 29 effects the flow amount of the incoming outside air into the case 20 as described above. Thus, in view of the forming situation of the above described fiber balls, the suction amount (m³/min) per unit time through the suction ports 29 is determined.

Here preferably, as shown in FIG. 1B, a pipe axial direction C29d of the suction ducts 29d faces diagonally upward in such an inclined gradient as to increase the further away from the case 20. Then, in this case, since the suction direction with the tip section 29de of the suction duct 29d faces diagonally upwards, with the suction force having the upward direction component, the pulp fibers in the case 20 can be sucked up. Then, in this way, the pulp fibers that have dropped onto and accumulated on the upper surface of the endless belt 62 of the secondary waste material discharge mechanism 60 positioned below the case 20 can also be sucked up, and this also contributes to improving the collection rate of the pulp fibers. The inclination degree θc29d of the pipe axial direction C29d from a horizontal direction is selected from a range greater than 0° and smaller than 90°, and is preferably selected from a range of 45° to 60°. By the way, when this angle is set to smaller than 45°, it becomes difficult for the SAPs and the like to fall in the suction duct 29d and accumulate easily, and on the other hand, in the case that this angle is set to greater than 60°, attaching of the suction duct 20d becomes difficult.

It should be noted that, in the case that the pipe axial direction C29d is facing diagonally upward as above, basically, a bottom surface 29db of the suction duct 29d is formed as an inclined surface that lowers as it nears the case 20, as shown in FIG. 1B. Thus, even in the event that the SAPs and the foreign matter are sucked into the suction port 29, as long as the SAPs and the foreign matter drop on the bottom surface 29db of the suction duct 29d under its own weight, the SAPs and the foreign matter slip down and are guided to return into the case 20, with inclination from a horizontal direction of the bottom surface 29db. Then, in this way, a state in which the suction ports 29, that are to selectively suck in the pulp fibers, collecting the erroneously sucked in SAPs and foreign matter together with the pulp fiber in the end can be effectively prevented. The inclination degree θ29db from the horizontal direction of the bottom surface 29db is selected from a range greater than 0° and smaller than 90°, and preferably is selected from a range of 45° to 60°. By the way, in the case that the angle is set smaller than 45°, it becomes difficult for the SAPs and the like to slide on the bottom surface 29db of the suction duct 29d, and easily accumulate on the bottom surface 29db, and on the other hand in the case that the angle is set greater than 60°, attachment of the suction duct 29d becomes difficult.

Further, more preferably, as shown in FIG. 1B, a suction direction in a connecting position between the suction duct 20d and the intermediate pipe member 29 is set diagonally downwards. Then, in this way, a state in which the pulp fibers that have been sucked in and collected return again into the case 20 can be certainly prevented.

It should be noted that, the opening shape of the suction port 29 is not limited to the above described rectangle in any way, and may be a circle, or a polygon other than a rectangle.

Further, in the above described example, the above suction port 29 is provided to only the left side wall section 20sl and the right side wall section 20sr, but it is not limited to this in any way. For example, the suction port 29 may be provided further to the front side wall section 20sf and the rear side wall section 20sb in addition to the left side wall section 20sl and the right side wall section 20sr, or in some cases, instead of the left side wall section 20sl and the right side wall section 20sr, the suction port 29 may be provided to both or only one of the front side wall section 20sf and the rear side wall section 20sb.

Furthermore, the part to provide the suction port 29 is not limited to each of the side wall sections 20sl, 20sr, 20sf, 20sb of the case 20 in any way. For example, it may be as shown in the modified example shown in FIG. 7A and FIG. 7B. It should be noted that, FIG. 7A is a schematic vertical section view, and FIG. 7B is a B-B arrow view in FIG. 7A.

In this modified example, a round pipe 29p as a pipe member having a suction port 29 is arranged charged into a lower space SP20d from its front to its rear with the pipe axial direction in a position in parallel along the front-rear direction. Then, the lower surface of the round pipe 29p is formed with 12 suction ports 29, 29 . . . that pass through as one example of a plurality of ports. In more detail, this lower surface has a suction port row G29 formed with six suction ports 29, 29 . . . arranged in a row in the front-rear direction as one example of a plurality of suction ports, and this suction port row G29 is provided with only two rows as one example of a plurality of rows in the left-right direction.

Further, a pipe end section to the rear side which is the front end side of the insertion direction of the round pipe 29d is sealed airtight, but the pipe end section to the front side which is the opposite side protrudes to the outside of the case 20, and this pipe end section is connected to a blower (not shown) via an appropriate intermediate pipe member 29m such as a hose.

Thus, with the operation of this blower, from each of the suction ports 29 of the round pipe 29p, the air inside the lower space SP20d is sucked in, and in this way the pulp fibers that are floating in the lower space SP20d can be collected.

It should be noted that, in this example, this round pipe 29p is arranged in a plurality of numbers (two in FIG. 7B) aligned in the left-right direction in the lower space SP20d, as shown in FIG. 7B, and in this way, a suction force distribution in the left-right direction is made uniform, but the number of the pipe is not limited to this in any way, and for example, one, or equal to or greater than three may be provided.

Further, in this example, the shape of the suction port 29 is made as a slit form having a length of 150 mm±50 mm×a width 8 to 20 mm along the longitudinal direction in the tube axial direction of the round pipe 29p, but this shape is not limited to the slit form in any way. It should be noted that, the upper limit value of the length is determined based on an anti-deformability of the round pipe 29, and the lower limit value of the width is determined from the viewpoint of prevention of clogging.

Further, in the above description, the round pipe 29p with a section shape of a circular shape as the round pipe 29p is exemplified, but it is not limited to this in any way, and for example, a square pipe with a rectangular shape in cross section may be used.

Further, in the example in FIG. 7A and FIG. 7B, the pipe end section to the rear side of the round pipe 29p is protruded to the outside of the case 20 and sealed in an airtight manner, but in some cases, the pipe end section to the rear side may be connected with an appropriate intermediate pipe member (not shown) such as a hose, and via the intermediate pipe member, may be connected to the blower connected with the above described pipe end section to the front side. In this way, the suction force becoming nonuniform, such as the suction force of the suction port 29 positioned to the rear side of the round pipe 29p becoming weaker as compared to the front side, can be effectively suppressed, and in this way, over the front-rear direction of the lower space SP20d, the pulp fibers can be sucked in substantially a uniform manner.

By the way, there is a possibility that on the upper surface of this round pipe 29p, the pulp fibers, the SAP, and the foreign matter that pass through the through holes h26, h26 . . . (not shown in FIG. 7A and FIG. 7B) of the partition board 26 and drop from the upper space SP20u to the lower space SP20d may accumulate. Then, in order to avoid this accumulation, the upper section of the round pipe 29p is covered with an inclined member 29r having upper surfaces inclined with a predetermined inclination gradient from the horizontal direction. In the example in FIG. 7A and FIG. 7B, the inclined member 29r is a sectional inverted V-shaped member 29r which is a pair of flat plates connected in an inverted V-shape, for example. Then, a pointed section 29rl of the sectional inverted V-shaped member 29r is arranged to be positioned in a central position in the left-right direction. Thus, the upper surfaces of the sectional inverted V-shaped member 29r have inclined gradients with the position of the ends lower than the central position in the left-right direction. In this way, the pulp fibers, the SAP, and the foreign matter that have dropped onto the upper surfaces, quickly slide down these upper surfaces and the above accumulation is prevented.

It should be noted that, preferably each of the end edges 29re, 29re of the sectional inverted V-shaped member 29r in the left-right direction as shown in FIG. 7B may be in a canopy form extending outward to the side with respect to the round pipe 29p. Then, in this way, this canopy form part can become an obstacle when sucking in the dropping SAP and the foreign matter through the suction port 29, and as a result, the erroneous sucking in of the SAP and the foreign matter through the suction port 29 can be effectively prevented.

By the way, from the viewpoint of collection of the pulp fibers in the lower space SP20d with the suction port 29, preferably, as shown in FIG. 1B, the position of the upper surface of the endless belt 62 of the secondary waste material discharge mechanism 60 may be separated from a lowermost position P26 of the partition board 26 with regard to the up-down direction in a range of 400 to 500 mm. The reason is as follows. In other words, it is difficult to make the pulp fibers, which have once landed on the endless belt 62, again float and float in the air, and it is preferable to suck in with the suction port 29 the pulp fibers while they are dropping as much as possible. Thus, with the aforementioned separation distance, the amount of the pulp fibers that accumulates on the upper surface of the endless belt 62 may be significantly decreased. In the present embodiment, however, as described above, the pulp fibers that have been dropped on the endless belt 62 can be collected as fiber balls, thus by collecting as the fiber balls, decrease in the collection rate of the pulp fibers can be prevented. By the way, the upper limit value of 500 mm is determined from the viewpoint of suppressing the separating device 10 from becoming a large size.

Other Embodiment Modes

The embodiment modes of this invention have been described above, and the above embodiment modes are to facilitate understanding of this invention, and are not for limiting understanding of this invention. Further, it is needless to say that this invention may be changed and modified, without departing from the gist thereof, and this invention includes its equivalents. For example, modifications as indicated below are possible.

In the above described embodiment modes, the disposable diapers are exemplified as an example of the absorbent articles, but it is not limited to this in any way, as long as they are articles that absorb liquid such as bodily fluids, and for example the absorbent articles may be sanitary napkins, or may be pet sheets used as a place for excretion of pets.

In the above described embodiment modes, the pulp fibers are exemplified as the liquid absorbent fibers, but it is not limited thereto. In other words, as long as it is a material having a fibrous liquid absorbent ability, it may be included in the concept of the above liquid absorbent fibers.

In the above described present embodiment mode, the axial direction of the revolving axis C31 and the rotating axis C33 of the shaft members 33 of the rotation member 30 is in parallel with the front-rear direction which is a predetermined direction from the charge port 22 to the discharge port 24, but it is not limited thereto, and may be inclined by a slight inclination angle. In other words, the axial direction may be inclined from the front-rear direction which is the predetermined direction in an inclination angle range of 0° or greater to 10° or less, or may be inclined from the front-rear direction which is the predetermined direction in an inclination angle range of 0° or greater to 5° or less, or may be inclined from the front-rear direction which is the predetermined direction in an inclination angle range of 0° or greater to 2° or less. Thus, the meaning of the wording "along" in "a revolving axis whose axial direction is set along a predetermined direction directed from the charge port to the discharge port" and "a rotating axis whose axial direction is set along the predetermined direction" described in the claims includes not only the case in which they are parallel with each other, but also the mode in which the axes are inclined at the above described inclination angle.

In the above described embodiment modes, the rotation member 30 has four shaft members 33, 33 as an example of a plurality of shaft members, but it is not limited thereto in any way. For example, the rotation member 30 may have one to three shaft members 33, or may have equal to or more than five shaft members 33, 33 . . . .

In the above described embodiment modes, the shaft member 33 has the protruding section group G33t, and the protruding section group G33t has six protruding sections 33t as one example of a plurality of protruding sections, but it is not limited to this in any way. For example, the protruding section group G33t may have one to five protruding sections 33t, or may have equal to or greater than seven protruding sections 33t, 33t . . . .

In the above described embodiment modes, all four shaft members 33, 33 . . . are revolved and rotated with one electric motor 37 as the drive source, but it is not limited to this in any way. For example, the electric motor to revolve the shaft members 33 and the electric motor to rotate them may be provided separately, and further each of the shaft members 33 may have an electric motor for rotating.

In the above described embodiment modes, the material of the case 20 is not mentioned, but the case 20 may preferably be formed with a resin board or a glass board that is colorless and transparent, colored and transparent, colorless and translucent, or colored and translucent. In that case, the opening state in the cases 20 can be made visible from the outside through the case 20. Then, in this way, an abnormality such as clogging of the waste material can be detected in an early stage, and can be handled before becoming a major problem.

In the above described embodiment mode, a configuration including the shaft members 33 configured to revolve around the revolving axis C31 while each rotating around the rotating axis C33, is exemplified as the rotation member 30 configured to stir and open the waste material, but it is not limited thereto in any way. For example, a configuration may be made as shown in FIG. 8A and FIG. 8B. FIG. 8A is a schematic vertical sectional view and FIG. 8B is a B-B arrow view in FIG. 8A. Then, in this example, a roll member configured to drivingly rotate around a rotation axis C130 whose axial direction is along the front-rear direction is made as a main body of a rotation member 130, and a plurality of rectangular plate rows, which are each formed by arranging a plurality of rectangular plates 133, 133 . . . in line in a comb-like manner with predetermined pitches in a direction along the rotation axis C130, are provided around the peripheral surface of this roll member with predetermined pitches in the peripheral direction of the rotation member 130, and this may be acceptable. Incidentally, the above-described rectangular plates 133, 133 . . . correspond to "protruding sections" described in a claim.

Figure 9:
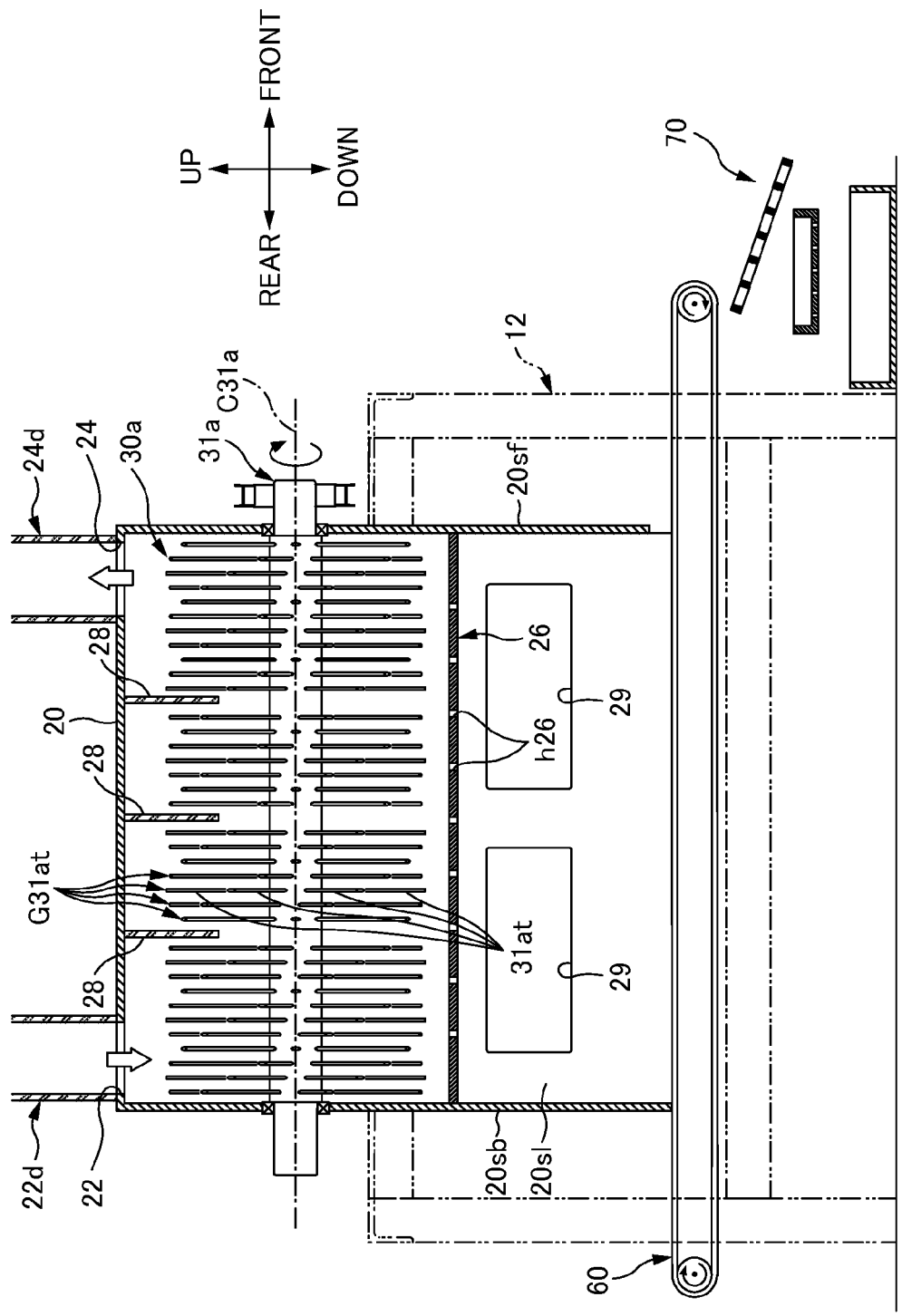
FIG. 9 is a schematic vertical sectional view showing a rotation member 30a according to another embodiment mode.

Further, a configuration may be made as shown in the schematic vertical sectional view of FIG. 9. In other words, a shaft member 31a, which is configured to drivingly rotate around a rotation axis C31a whose axial direction is along the front-rear direction, is made as a main body of a rotation member 30a, and the rotation member 30a, which includes, at a plurality of positions in the axial direction, stick-like member groups G31at formed such that a plurality of stick-like members 31at, 31at . . . are provided to stand radially on the peripheral surface of this shaft member 31a, may be used in place of the aforementioned rotation member 30.

In the above described embodiment mode, the gap G between the lower end edge section of the front side wall section 20sf of the case 20 and the upper surface of the endless belt 62 of the secondary waste material discharge mechanism 60 functions as an airflow supply mechanism in cooperation with the negative pressure condition forming mechanism, but it is not limited thereto in any way. For example, a nozzle may be provided as an airflow supply device at a position forward with respect to the position where the second waste material falls on the upper surface of the endless belt 62, and an airflow directed to the rear along the upper surface of the endless belt 62 may be ejected from the nozzle.

In the above described embodiment mode, fiber balls discharged outside the case 20 is separated from the SAPs and foreign matter by the first sieve member 72, but it is not limited thereto in any way. For example, the fiber balls may be separated from the SAPs and foreign matter on the endless belt 62 by suctioning the fiber balls discharged outside the case 20 with a suctioning device not shown arranged above the endless belt 62.

In the above described embodiment mode, the secondary separating unit 10b serving as a separating device according to the present invention is directly connected below, i.e., downstream of the primary separating unit 10a serving as an opening mechanism including the rotation member 30, thereby achieving the improvement in the purity of the collected SAPs, but it is not limited thereto in any way. In other words, only the secondary separating unit 10b can be used separately, or may be directly connected downstream of an appropriate separating device other than the above described opening mechanism.

REFERENCE SIGNS LIST 10 separating device
10a primary separating unit (opening mechanism)
10b secondary separating unit (separating device)
12 frame-like supporting member
20 case
20c ceiling section
20sb rear side wall section
20sf front side wall section
20sl left side wall section
20sr right side wall section
22 charge port
22d charge duct
24 discharge port
24d discharge duct
26 partition board (partition member)
28 regulating board (regulating member)
28d lower side edge section
29 suction port
29d duct
29db bottom surface
29de tip section
29e opening section
29m intermediate pipe member
29p round pipe (pipe member)
29r inclined member
29rl pointed section
29re end edge
30 rotation member
30a rotation member
31 revolving axis forming shaft member
31a shaft member
31at stick-like member
31p outer pipe
31s inner shaft
33 shaft member
33t stick-like member (protruding section)
35b flange board
35f flange board
37 electric motor
60 secondary waste material discharge mechanism
62 endless belt
64 roller
72 first sieve member (sieve member)
74 second sieve member (second sieve member)
76 lidless container
130 rotation member
133 rectangular plate (protruding section)
B31 endless belt
B33 endless belt
G29 suction port row
G33t protruding section group
G31at stick-like member group
Brg31 bearing
Brg33 bearing
h26 through hole
h72 through hole
h74 through hole
GND ground section
G gap
C31 revolving axis
C31a rotation axis
C33 rotating axis
C130 rotation axis
SP20 interior space
SP20u upper space
SP20d lower space
P31b pulley
P31f pulley
P33 pulley
P37 pulley
P62 turning position
P72 landing position
P26 lowermost position
G gap

The invention claimed is:

1. A separating device that separates particulate superabsorbent polymers and liquid absorbent fibers included in a material of an absorbent article, the separating device comprising:
a belt member configured to move along a predetermined moving direction while receiving the material falling on an upper surface of the belt member;
an airflow supply mechanism configured to supply an airflow in a direction opposite to the moving direction of the belt member, to roll the liquid absorbent fibers on the upper surface of the belt member into fiber balls and regulate movement of the fiber balls to a downstream side of the moving direction, wherein the airflow supply mechanism is configured to supply the airflow along the upper surface from the downstream side of the moving direction with respect to a position where the material falls, so as to separate the liquid absorbent fibers and the superabsorbent polymers; and a case including
an opened lower end facing the upper surface of the belt member, and
wall sections having a wall section positioned on the downstream side of the moving direction with respect to the belt member; and
a negative pressure condition forming mechanism configured to maintain an interior space of the case in a negative pressure condition in which an air pressure is lower than that of an exterior of the case,
wherein
a gap, formed between the upper surface of the belt member and the wall section of the case, defines the airflow supply mechanism, and
the airflow supply mechanism is configured to, in cooperation with the negative pressure condition forming mechanism, cause incoming outside air entering from the gap into the interior space of the case to become the airflow in the direction opposite to the moving direction.

2. The separating device according to claim 1, wherein the airflow supply mechanism is configured to supply the airflow to regulate movement of the fiber balls in the moving direction, such that the fiber balls roll and entangle the surrounding liquid absorbent fibers and grow into a snowball form, and
the wall section of the case and the belt member are configured to catch the fiber balls having grown to a size corresponding to the gap between the belt member and the-wall section,
the belt member is configured to have an increased moving force in the moving direction to act on the fiber balls such that the fiber balls, while resisting the airflow, are ejected from the gap to the exterior of the case based on the increased moving force.

3. The separating device according to claim 2, further comprising a first sieve member,
wherein
the belt member is an endless belt and has a folded position positioned, in the moving direction of the belt member, outwardly with respect to the case,
the first sieve member is arranged below the folded position and includes a plurality of first through holes, and
a hole size of the plurality of first through holes is set to allow the superabsorbent polymers to pass through the first sieve member and restrain the fiber balls from passing through the first sieve member.

4. The separating device according to claim 3, further comprising:
the sieve member includes a transporting mechanism configured to transport the fiber balls, having been restrained from passing through the first sieve member and captured by the first sieve member, to a position distant from a landing position where the material falls at the first sieve member.

5. The separating device according to claim 4, further comprising a second sieve member, wherein the second sieve member is arranged below the first sieve member, and includes a plurality of second through holes, and
a hole size of the plurality of second through holes is set to allow the superabsorbent polymers to pass through the second sieve member and restrain foreign matter included in the material from passing through the second sieve member.

6. The separating device according to claim 1, further comprising:
first and second blowers; and
an opening mechanism configured to
open a primary material and separate the opened primary material into a secondary material, and
cause the secondary material to fall, as the material, toward the upper surface of the belt member,
wherein
the interior space of the case is partitioned by a partition member into an upper space and a lower space adjacent to a lower side of the upper space,
a main body of the opening mechanism,
the opening mechanism includes
a charge port which is formed in the case, and through which the primary material is charged to the upper space while being made to ride on the airflow,
a rotation member housed in the upper space as the main body of the opening mechanism, the rotation member being configured to stir and open the primary material,
a discharge port through which the liquid absorbent fibers in the primary material opened by the rotation member are discharged from an interior of the upper space while being made to ride on the airflow, and
a plurality of through holes formed in the partition member, and configured to cause the secondary material to fall through the through holes toward the upper surface of the belt member, and
the first blower, configured to charge the airflow from the charge port, and the second blower, configured to discharge the airflow from the discharge port with a discharge amount larger than a charge amount of the air flow of the first blower, cooperate with each other to define the negative pressure condition forming mechanism.

7. The separating device according to claim 6, further comprising a suction port, wherein
the suction port, through which air in the lower space is suctioned, is provided in the lower space and configured to suck the liquid absorbent fibers passing downward through the through holes of the partition member and being suspended in the lower space.

8. The separating device according to claim 6, wherein
a direction from the charge port toward the discharge port is a predetermined direction,
the rotation member includes
a revolving axis having an axial direction set along the predetermined direction, and
a shaft member configured to rotate about a rotating axis while revolving about the revolving axis, the rotating axis having an axial direction set along the predetermined direction, and
the shaft member includes protruding sections protruding outwardly in a direction that intersects with the axial direction of the rotating axis of the shaft member.

9. The separating device according to claim 6, further comprising a regulating member, wherein the charge port and the discharge port are provided in a ceiling section in the case, and the regulating member which hangs from the ceiling section at a predetermined position between the charge port and the discharge port in the upper space, the regulating member being configured to regulate movement of the primary material from the charge port to the discharge port.

10. A method of separating particulate superabsorbent polymers and liquid absorbent fibers included in a material of an absorbent article, the method comprising:

moving a belt member along a predetermined moving direction to receive the material falling on an upper surface of the belt member;

supplying, by an airflow supply mechanism, an airflow in a direction opposite to the moving direction of the belt member, to roll the liquid absorbent fibers on the upper surface of the belt member into fiber balls and regulate movement of the fiber balls to a downstream side of the moving direction, wherein the airflow supply mechanism supplies the airflow along the upper surface from the downstream side of the moving direction with respect to a position where the material falls, so as to separate the liquid absorbent fibers and the superabsorbent polymers; and maintaining, by a negative pressure condition forming mechanism, an interior space of a case in a negative pressure condition in which an air pressure is lower than that of an exterior of the case, wherein the case includes:

an opened lower end facing the upper surface of the belt member, and wall sections having a wall section positioned on the downstream side of the moving direction with respect to the belt member, a gap, formed between the upper surface of the belt member and the wall section of the case, defines the airflow supply mechanism, and the airflow supply mechanism, in cooperation with the negative pressure condition forming mechanism, causes incoming outside air entering from the gap into the interior space of the case to become the airflow in the direction opposite to the moving direction.

11. The separating device according to claim 1, wherein the interior space of the case is partitioned by a partition member into an upper space and a lower space adjacent to a lower side of the upper space, a main body of an opening mechanism, configured to open a primary material and separate the opened primary material into a secondary material and liquid absorbent fibers, is arranged in the upper space, and the opening mechanism is configured to cause the secondary material to fall, as the material, toward the upper surface of the belt member, the opening mechanism includes a charge port, formed in the case, through which the primary material is charged to the upper space while being made to ride on an airflow, a rotation member housed in the upper space as the main body of the opening mechanism, the rotation member being configured to stir and open the primary material, a discharge port through which liquid absorbent fibers in the primary material opened by the rotation member are discharged from an interior of the upper space while being made to ride on an airflow, and a plurality of through holes formed in the partition member, the secondary material falls through the through holes toward the upper surface of the belt member, and a first blower, configured to charge an airflow from the charge port, and a second blower, configured to discharge an airflow from the discharge port with a discharge amount larger than a charge amount of the air flow of the first blower, cooperate with each other and function as the negative pressure condition forming mechanism.

12. The separating device according to claim 11, wherein a suction port, through which air in the lower space is suctioned, is provided in the lower space, and liquid absorbent fibers, passing downward through the through holes of the partition member and being suspended in the lower space, are suctioned through the suction port.

13. The separating device according to claim 11, wherein assuming that a direction from the charge port toward the discharge port is a predetermined direction, the rotation member includes a revolving axis whose axial direction is set along the predetermined direction, and a shaft member configured to rotate about a rotating axis whose axial direction is set along the predetermined direction while revolving about the revolving axis, and the shaft member includes protruding sections protruding outwardly in a direction that intersects with the axial direction of the shaft member.

14. The separating device according to claim 11, wherein the charge port and the discharge port are provided in a ceiling section in the case, and a regulating member hangs from the ceiling section at a predetermined position between the charge port and the discharge port in the upper space, the regulating member being configured to regulate movement of the primary material from the charge port to the discharge port.

15. A separating device that separates particulate superabsorbent polymers and liquid absorbent fibers included in a material of an absorbent article, the separating device comprising:

a belt member configured to move along a predetermined moving direction while receiving the falling material on an upper surface of the belt member;

an airflow supply mechanism configured to supply an airflow in a direction opposite to the moving direction of the belt member, along the upper surface from a downstream side of the moving direction with respect to a position where the material falls;

a case including an opened lower end facing the upper surface of the belt member, and wall sections having a wall section positioned on the downstream side of the moving direction with respect to the belt member; and a negative pressure condition forming mechanism configured to maintain an interior space of the case in a negative pressure condition in which an air pressure is lower than that of an exterior of the case, wherein in a case the superabsorbent polymers are sent to the downstream side of the moving direction by way of movement of the belt member, the airflow rolls the liquid absorbent fibers on the upper surface of the belt member and forms fiber balls while regulating movement of the liquid absorbent fibers to the downstream side of the moving direction, to separate the liquid absorbent fibers and the superabsorbent polymers, a gap, formed between the upper surface of the belt member and the wall section of the case, defines the airflow supply mechanism, and the airflow supply mechanism is configured to, in cooperation with the negative pressure condition forming mechanism, cause incoming outside air entering from the gap into the interior space of the case to become the airflow in the direction opposite to the moving direction.

\* \* \* \* \*